United States Patent
Lin

(10) Patent No.: US 11,704,980 B2
(45) Date of Patent: Jul. 18, 2023

(54) METHOD, APPARATUS, AND COMPUTER STORAGE MEDIUM FOR OUTPUTTING VIRTUAL APPLICATION OBJECT

(71) Applicant: TENCENT TECHNOLOGY (SHENZHEN) COMPANY LIMITED, Guangdong (CN)

(72) Inventor: Jie Qiong Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 176 days.

(21) Appl. No.: 17/460,610

(22) Filed: Aug. 30, 2021

(65) Prior Publication Data

US 2021/0390833 A1    Dec. 16, 2021

Related U.S. Application Data

(63) Continuation of application No. PCT/CN2020/115219, filed on Sep. 15, 2020.

(30) Foreign Application Priority Data

Sep. 26, 2019  (CN) .......................... 201910914842.0

(51) Int. Cl.
  *G07F 17/32*   (2006.01)
  *A63F 13/52*   (2014.01)
  *A63F 13/55*   (2014.01)

(52) U.S. Cl.
  CPC .......... *G07F 17/3293* (2013.01); *A63F 13/52* (2014.09); *A63F 13/55* (2014.09); *G07F 17/3213* (2013.01)

(58) Field of Classification Search
  USPC ................................................ 463/13, 12, 11
  See application file for complete search history.

(56) References Cited

U.S. PATENT DOCUMENTS 11,335,058 B2 *  5/2022  Loodin Ek .............. A63F 13/63
2021/0390833 A1 * 12/2021  Lin .................... G07F 17/3293
(Continued)

FOREIGN PATENT DOCUMENTS

CN        103810379 A       5/2014
CN        105653831 A       6/2016
(Continued)

OTHER PUBLICATIONS

International Search Report for PCT/CN2020/115219 dated Dec. 16, 2020 [PCT/ISA/210].

(Continued)

*Primary Examiner* — Pierre E Elisca
(74) *Attorney, Agent, or Firm* — Sughrue Mion, PLLC

(57) ABSTRACT

A method by a network device for outputting a virtual application object includes acquiring current status information of a plurality of virtual application objects in a virtual application, the current status information indicating that a virtual application object is in a known state or in an unknown state, constructing a virtual application object status plane based on the current status information of the plurality of virtual application objects, where the virtual application object status plane includes a region corresponding to each virtual application object, the region includes the current status information of the corresponding virtual application object, determining, based on the virtual application object status plane, output probabilities corresponding to a plurality of to-be-outputted virtual application objects, and determining, based the output probabilities corresponding to the plurality of to-be-outputted virtual application objects, a target virtual application object from the plurality of to-be-outputted virtual application objects.

20 Claims, 13 Drawing Sheets

(56) References Cited

U.S. PATENT DOCUMENTS

2022/0114787 A1\* 4/2022 Loodin Ek .............. A63F 13/63
2022/0343594 A1\* 10/2022 Loodin Ek .............. A63F 13/63

FOREIGN PATENT DOCUMENTS

| CN | 107648853 A | 2/2018 |
|----|-------------|--------|
| CN | 110598182 A | 12/2019 |
| CN | 110721471 A | 1/2020 |

OTHER PUBLICATIONS

Written Opinion for PCT/CN2020/115219 dated Dec. 16, 2020 [PCT/ISA/237].
Translation of the Written Opinion dated Dec. 18, 2020 in Application No. PCT/CN2020/115219.

\* cited by examiner

METHOD, APPARATUS, AND COMPUTER STORAGE MEDIUM FOR OUTPUTTING VIRTUAL APPLICATION OBJECT

CROSS REFERENCE TO RELATED APPLICATION(S)

This application is a continuation application of International Application No. PCT/CN2020/115219, which claims priority to Chinese Patent Application No. 201910914842.0, filed with the China National Intellectual Property Administration on Sep. 26, 2019, the entire contents of which are incorporated by reference herein.

FIELD

The disclosure generally relates to the field of artificial intelligence (AI), and in particular, to a virtual application object processing technology.

BACKGROUND

Generally, for online games, the Internet serves as a transmission medium, a game operator server and a user computer serve as a processing terminal, and game client software serves as an information exchange window. Online games include sustainable individual multiplayer online games that provide entertainment, leisure, communication, and virtual achievements.

With the development of online games, users have increasingly high requirements for the online games. For an online game including a virtual application object outputting step, such as chess and card games that can output a recommended operation, the users expect that the online game can output accurate virtual application objects. However, because some online games have various types of virtual application objects, outputted virtual application objects are usually inaccurate.

SUMMARY

Embodiments provide a method, apparatus, and computer storage medium for outputting a virtual application object, which may improve the accuracy of outputting a target virtual application object.

According to an aspect of example embodiments, a method by a network device for outputting a virtual application object may include acquiring current status information of a plurality of virtual application objects in a virtual application, the current status information indicating that a virtual application object is in a known state or in an unknown state, constructing a virtual application object status plane based on the current status information of the plurality of virtual application objects, where the virtual application object status plane includes a region corresponding to each virtual application object, the region includes the current status information of the corresponding virtual application object, determining, based on the virtual application object status plane, output probabilities corresponding to a plurality of to-be-outputted virtual application objects, and determining, based the output probabilities corresponding to the plurality of to-be-outputted virtual application objects, a target virtual application object from the plurality of to-be-outputted virtual application objects.

According to an aspect of example embodiments, an apparatus for outputting a virtual application object may include at least one memory configured to store computer program code, and at least one processor configured to access said computer program code and operate as instructed by said computer program code, said computer program code including first acquisition code configured to cause the at least one processor to acquire current status information of a plurality of virtual application objects in a virtual application, the current status information indicating that a virtual application object is in a known state or in an unknown state, construction code configured to cause the at least one processor to construct a virtual application object status plane based on the current status information of the plurality of virtual application objects, where the virtual application object status plane includes a region corresponding to each virtual application object, the region includes the current status information of the corresponding virtual application object, determining code configured to cause the at least one processor to determine, based on the virtual application object status plane, output probabilities corresponding to a plurality of to-be-outputted virtual application objects, and outputting code configured to cause the at least one processor to determine, based the output probabilities corresponding to the plurality of to-be-outputted virtual application objects, a target virtual application object from the plurality of to-be-outputted virtual application objects.

According to an aspect of example embodiments, a non-transitory computer-readable storage medium may store computer instructions that, when executed by at least one processor of a device, cause the at least one processor to acquire current status information of a plurality of virtual application objects in a virtual application, the current status information indicating that a virtual application object is in a known state or in an unknown state, construct a virtual application object status plane based on the current status information of the plurality of virtual application objects, where the virtual application object status plane includes a region corresponding to each virtual application object, the region includes the current status information of the corresponding virtual application object, determine, based on the virtual application object status plane, output probabilities corresponding to a plurality of to-be-outputted virtual application objects, and determine, based the output probabilities corresponding to the plurality of to-be-outputted virtual application objects, a target virtual application object from the plurality of to-be-outputted virtual application objects.

According to an aspect of example embodiments, a computer program product may include instructions, the instructions, when run on a computer, causing the computer to perform the foregoing method for outputting a virtual application object.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

The following embodiments provide a method, an apparatus, and computer storage medium for outputting a virtual application object. The apparatus for outputting a virtual application object may be integrated in a network device. The network device may be a terminal, a server, or the like. The terminal may be a mobile phone, a tablet computer, a notebook computer, a personal computer (PC), a micro processing box, or the like. The server may be an application server or a web server. During specific deployment, the server may be an independent server, a cluster server, or a cloud server.

Figure 1:
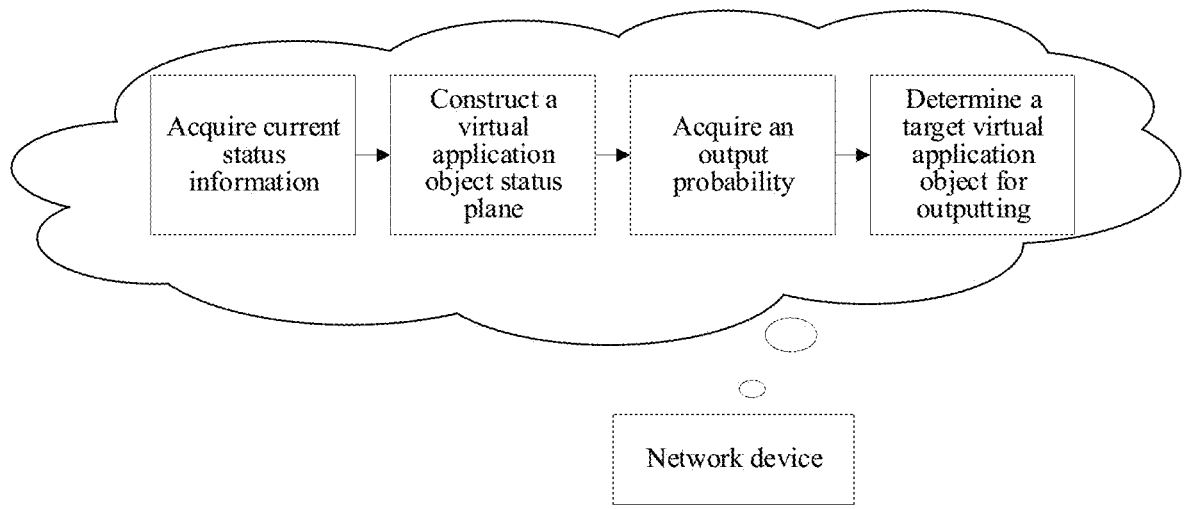
FIG. 1 is a scenario diagram of a system for outputting a virtual application object according to an embodiment.

FIG. 1 is a diagram of an application scenario of a method for outputting a virtual application object according to an embodiment. In an example where the apparatus for outputting a virtual application object is integrated in the network device, the network device may acquire current status information of a plurality of virtual application objects in a virtual application, the current status information indicating that a virtual application object is in a known state or an unknown state. The network device may construct a virtual application object status plane based on the current status information of the plurality of virtual application objects, where the virtual application object status plane includes a region corresponding to each virtual application objects, and the region includes the current status information of the corresponding virtual application object. The network device may determine output probabilities respectively corresponding to a plurality of to-be-outputted virtual application objects based on the virtual application object status plane. The network device may determine a target virtual application object from the plurality of to-be-outputted virtual application objects based on the output probabilities respectively corresponding to the plurality of to-be-outputted virtual application objects for outputting.

Detailed descriptions are separately provided below. A description order of the following embodiments is not construed as a limitation on a preferred order of the embodiments.

Figure 2:
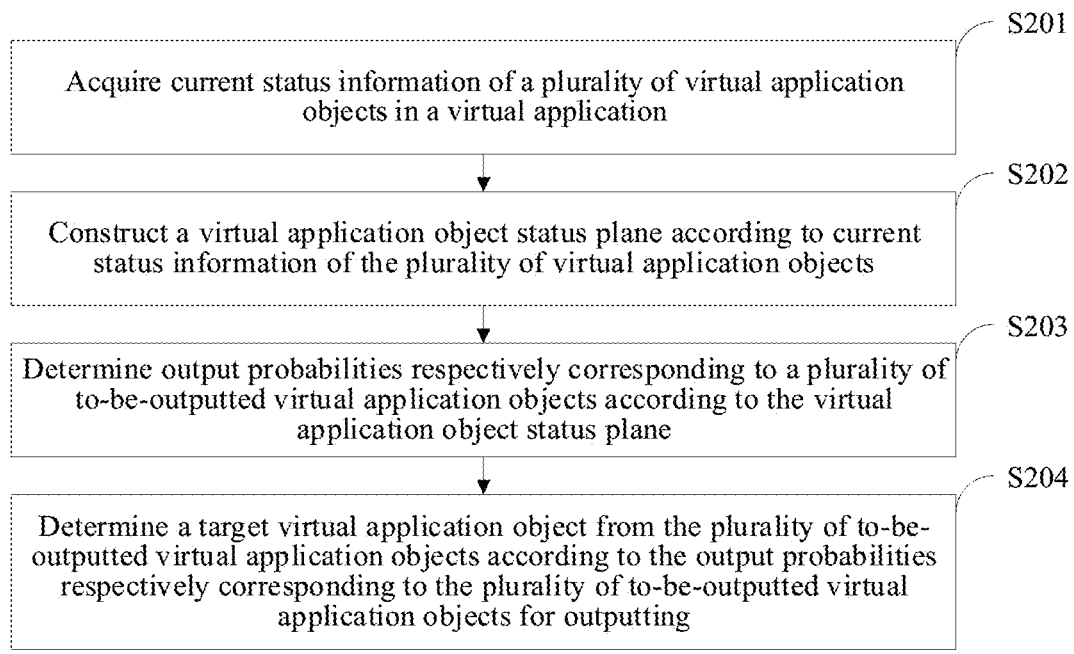
FIG. 2 is a first flowchart of a method for outputting a virtual application object according to an embodiment.

FIG. 2 is a first flowchart of a method for outputting a virtual application object according to an embodiment. An embodiment of the present disclosure provides a method for outputting a virtual application object. An example is used herein for description in which the method is performed by a server. As shown in FIG. 2, a specific process of the method for outputting a virtual application object may include the following steps:

In operation S201, the system acquires current status information of a plurality of virtual application objects in a virtual application.

The virtual application may be application software installed on a terminal, and may satisfy application requirements of users for different fields and different problems and provide users with rich experience. For example, the virtual application may be a game application, but is not limited thereto. The game application may be a software product obtained by combining various programs and animation effects. By using the game application, organs of a user such as a brain, eyes, and hands can be exercised, improving the logical ability, agility, and the like of the user. In another example, the virtual application may alternatively be a card game application to provide users with recommended operations, such as an online mahjong game application or an online poker game application.

The virtual application object may be an application-related virtual object in a virtual application. For example, when the virtual application is a game application, the virtual application object may be a game object. For example, in an online mahjong game application, a virtual application object may be a virtual mahjong tile; in an online card game application, a virtual application object may be a virtual card; and so on.

The current status information may be status information indicating a current status of a virtual application object in a virtual application. For example, when the virtual application is an online mahjong game application, the current status information may indicate current status information of a virtual mahjong tile. For example, the current status information may be used for indicating whether the virtual mahjong tile is in a known state or an unknown state.

For example, when the virtual application is an online mahjong game application, from a perspective of a current player, current status information corresponding to virtual mahjong tiles known to the current player, virtual mahjong tiles outputted by each player, and virtual mahjong tiles displayed by other players needs to indicate that the virtual mahjong tiles are in a known state, and current status information corresponding to other virtual mahjong tiles whose states cannot be learned may indicate that the virtual mahjong tiles are in an unknown state.

The definition of the current status information of the virtual application object may alternatively be adjusted based on an actual situation. For example, from the perspective of the current player, the mahjong tiles known to the current player, the virtual mahjong tiles outputted by each player, the virtual mahjong tiles displayed by other players, and the virtual mahjong tiles whose states cannot be learned may alternatively be identified as current status information of different types, and so on.

The current status information is not limited by an embodiment and may be properly adjusted based on different virtual applications, different virtual application objects, different game rules in virtual applications, and the like. The current status information of the virtual application object may be flexibly defined, which can improve the flexibility of the method for outputting a virtual application object, so that the method can adapt to more types of virtual applications.

The current status information may alternatively be represented by using an identifier. The current status information may be represented in many manners. For example, different types of current status information may be indicated by using different colors, different patterns, different characters, or the like. For example, the current status information may be represented by using a binary identifier "0" or "1". When the current status information is "0", it may indicate that a corresponding virtual mahjong tile is in an unknown state; when the current status information is "1", it may indicate that the corresponding virtual mahjong tile is in a known state, and so on.

During application, for example, when the virtual application is an online mahjong game application and the virtual application object is a virtual mahjong tile, current status information corresponding to each virtual mahjong tile may be determined. From the perspective of the current player, the virtual mahjong tiles whose states are known such as the mahjong tiles known to the current player, the virtual mahjong tiles outputted by each player, and the virtual mahjong tiles displayed by other players may be identified as a known state, and current status information of the virtual mahjong tiles whose states are known may be recorded as "1". The other virtual mahjong tiles whose states cannot be learned may be identified as an unknown state, and current status information of the virtual mahjong tiles whose states are unknown may be recorded as "0". By dividing the states of the virtual mahjong tiles into a known state and an unknown state, not only a status identification algorithm for the virtual mahjong tiles is simplified, but also subsequent outputting of virtual application objects is facilitated.

In another example, the mahjong tiles known to the current player, the virtual mahjong tiles outputted by each player, the virtual mahjong tiles displayed by other players, and the other virtual mahjong tiles whose states cannot be learned may alternatively be marked with different colors or different characters. The different colors or the different characters indicate different types of current status information, and so on.

The current status information is defined in many manners, which can improve the flexibility of the method for outputting a virtual application object in an embodiment, so that the method can adapt to more types of virtual applications, thereby improving the accuracy of outputting the virtual application object.

In operation S202, the system constructs a virtual application object status plane based on the current status information of the plurality of virtual application objects.

The virtual application object status plane may be a plane representing current statuses of all virtual application objects in the virtual application. The current statuses of all of the virtual application objects may be learned based on the plane. In addition, a calculation may be performed based on the plane, to determine an outputted target virtual application object.

Figures 11, 12, 13:
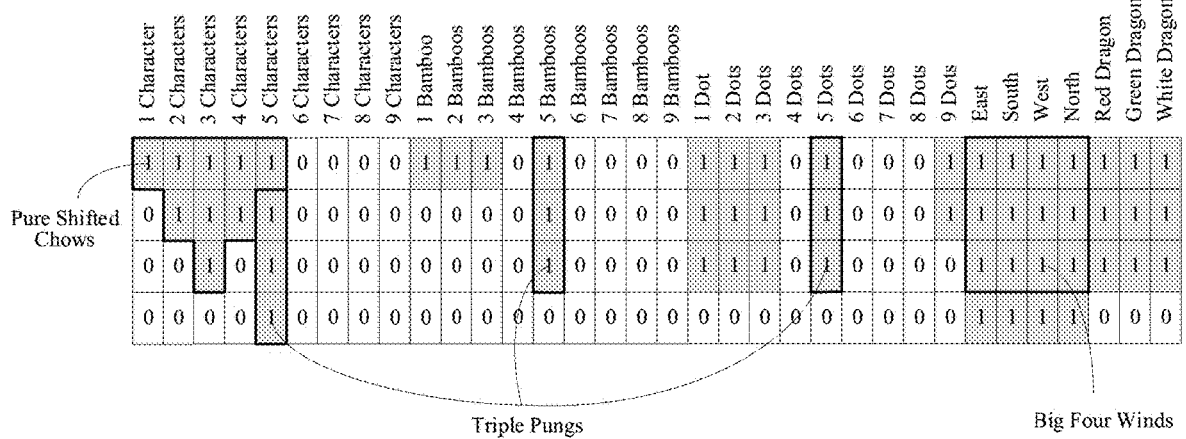
FIG. 11 is a first diagram of a first type of virtual application object status plane according to an embodiment.
FIG. 12 is a second diagram of the first type of virtual application object status plane according to an embodiment.
FIG. 13 is a third diagram of the first type of virtual application object status plane according to an embodiment.

FIG. 11 is a first diagram of a first type of virtual application object status plane according to an embodiment. For example, as shown in FIG. 11, the virtual application object status plane may include a region corresponding to each virtual application object. The regions are arranged based on a preset arrangement rule. Each region is used for recording the current status information of the virtual application object corresponding to the region.

During application, because tiles in some card games include different suits, different types, and combinations of suits and types. For example, mahjong tiles in Mahjong include different suits such as Character, Bamboo, Dot, Wind, and Dragon, and further include different face values such as one, two, and three. The suits and the face values are combined into 34 different mahjong tiles. Therefore, the current status information of the mahjong tiles may be represented on the plane in a binary form to facilitate subsequent learning of a network model.

For example, when the virtual application is an online mahjong game application and the virtual application object is a virtual mahjong tile, after current status information of each virtual mahjong tile is acquired, a virtual application object status plane may be constructed based on the current status information of each virtual mahjong tile. As shown in FIG. 11, a virtual application object status plane includes a plurality of rectangular regions. Each rectangular region represents one virtual mahjong tile. The plurality of rectangular regions are arranged based on mahjong tile names of virtual mahjong tiles corresponding to the regions in an order of "1 Character, 2 Characters, 3 Characters, 4 Characters, 5 Characters, 6 Characters, 7 Characters, 8 Characters, 9 Characters, 1 Bamboo, 2 Bamboos, 3 Bamboos, 4 Bamboos, 5 Bamboos, 6 Bamboos, 7 Bamboos, 8 Bamboos, 9 Bamboos, 1 Dot, 2 Dots, 3 Dots, 4 Dots, 5 Dots, 6 Dots, 7 Dots, 8 Dots, 9 Dots, East, South, West, North, Red Dragon, Green Dragon, and White Dragon". The overall arrangement is a 4*34 rectangular array. Each row in the rectangular array includes 34 virtual mahjong tiles with different names, and each column in the rectangular array includes four virtual mahjong tiles with the same name. Each rectangular region includes current status information "0" or "1" of the virtual mahjong tile corresponding thereto. A rectangular region including "0" may indicate that a virtual mahjong tile corresponding to the rectangular region is in an unknown state, and a rectangular region including "1" may indicate that a virtual mahjong tile corresponding to the rectangular region is in a known state. The virtual application object status plane constructed by using this method is a binary plane.

FIG. 12 is a second diagram of the first type of virtual application object status plane according to an embodiment. In an embodiment, to more clearly distinguish between virtual mahjong tiles whose states are unknown and virtual mahjong tiles whose states are known in the virtual application object status plane, as shown in FIG. 12, different current status information may alternatively be represented by using different colors.

In an embodiment, because the mahjong game has many manners of winning, the preset arrangement rule for the rectangular regions may be adjusted to improve the flexibility of the method for outputting a virtual application object. For example, regions corresponding to virtual mahjong tiles whose suits are "Bamboos" or "Dots" may be set at a leftmost end of the plane. Alternatively, regions corresponding to the same suit in the plane are arranged from left to right based on face values of virtual mahjong tiles in descending order.

A scoring type may be a name of a combination of various tiles with specific points or a name of the manner of winning in Mahjong. When a tile type conforms to a regulation and reaches or exceeds a win standard, a player may be considered to win.

FIG. 13 is a third diagram of the first type of virtual application object status plane according to an embodiment. In an embodiment a plurality of possible scoring sub-modes may be further found in the virtual application object status plane. As shown in FIG. 13, virtual mahjong tiles in regions enveloped by thick lines may respectively constitute scoring types of "Pure Shifted Chows", "Triple Pungs", and "Big Four Winds". The status plane of the virtual mahjong tiles is represented in this manner, so that a computer can identify a variety of scoring types based on the status plane, and then predict the outputting of the virtual application objects.

Figure 14:
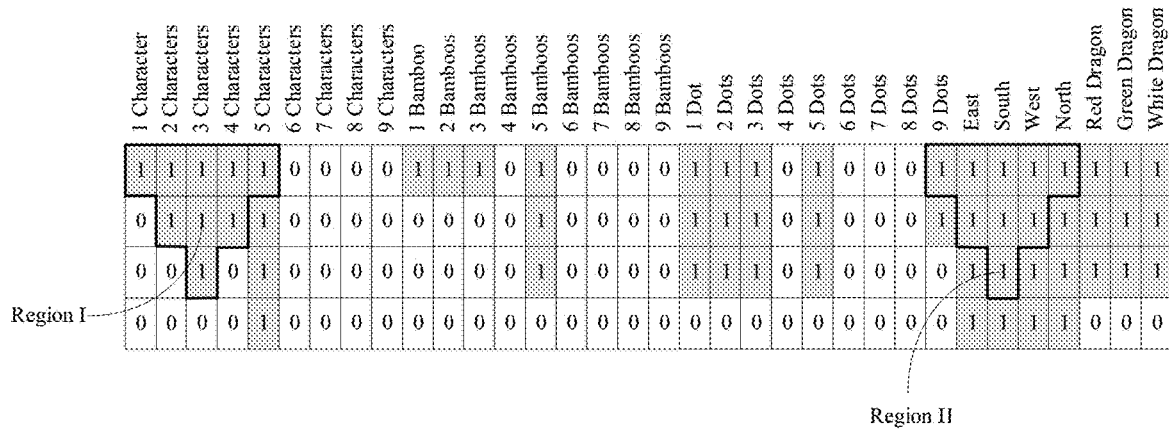
FIG. 14 is a fourth diagram of the first type of virtual application object status plane according to an embodiment.

FIG. 14 is a fourth diagram of the first type of virtual application object status plane according to an embodiment. In an embodiment, in the virtual application object status plane constructed according to the foregoing method, misjudgment of scoring types may occur. As shown in FIG. 14, a region I in the figure may indicate "Pure Shifted Chows". Although a shape of a region II is the same as that of the region I, the region II is not a representation form of "Pure Shifted Chows", causing difficulties in subsequent model learning.

Therefore, isolation regions may be added to the virtual application object status plane, to strictly distinguish between virtual application objects of different types in the status plane to resolve the misjudgment of scoring types. Specifically, operation S202 may include acquiring object types of the plurality of virtual application objects, and constructing the virtual application object status plane based on the current status information and the object types, where the virtual application object status plane include a plurality of status sub-planes and a plurality of isolation regions, the status sub-planes corresponds to the object types, and each of the isolation regions are located between two adjacent status sub-planes.

During application, for example, when the virtual application is an online mahjong game application and the virtual application object is a virtual mahjong tile, the virtual mahjong tiles may be divided into a plurality of object types. For example, the virtual mahjong tiles may be divided into five object types: "Character", "Bamboo", "Dot", "Wind", and "Dragon". The object type "Character" may include virtual mahjong tiles with nine names: "1 Character", "2 Characters", "3 Characters", "4 Characters", "5 Characters", "6 Characters", "7 Characters", "8 Characters", and "9 Characters". The object type "Bamboo" may include virtual mahjong tiles with nine names "1 Bamboo", "2 Bamboos", "3 Bamboos", "4 Bamboos", "5 Bamboos", "6 Bamboos", "7 Bamboos", "8 Bamboos", and "9 Bamboos". The object type "Dot" may include virtual mahjong tiles with nine names: "1 Dot", "2 Dots", "3 Dots", "4 Dots", "5 Dots", "6 Dots", "7 Dots", "8 Dots", and "9 Dots". The object type "Wind" may include virtual mahjong tiles with four names: "East", "South", "West", and "North". The object type "Dragon" may include virtual mahjong tiles with three names: "Red Dragon", "Green Dragon", and "White Dragon".

Figure 15:
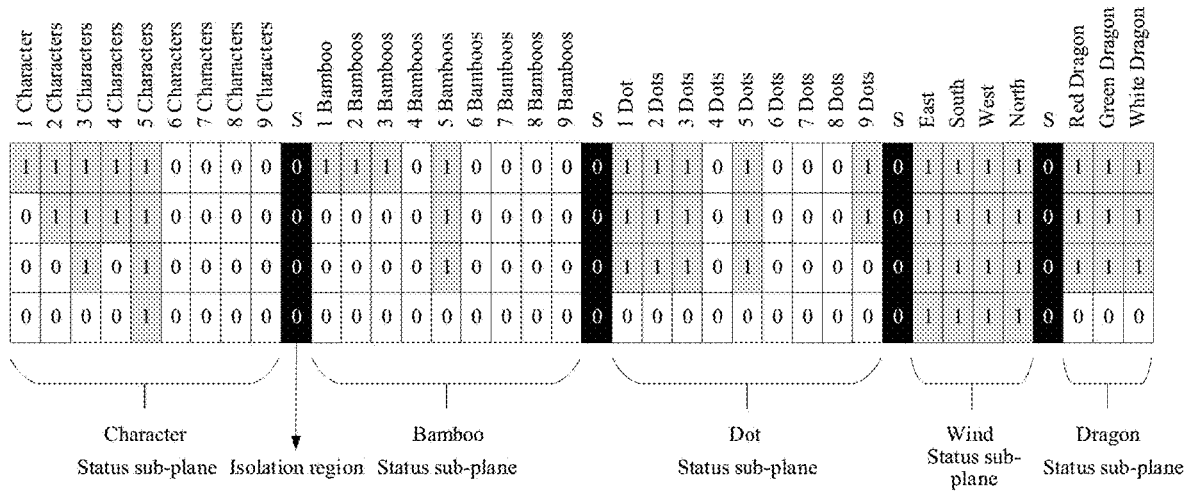
FIG. 15 is a first diagram of a second type of virtual application object status plane according to an embodiment.

FIG. 15 is a first diagram of a second type of virtual application object status plane according to an embodiment. After the object types corresponding to the virtual mahjong tiles are acquired, a virtual application object status plane may be constructed based on current status information of the virtual mahjong tiles and the object types corresponding to the virtual mahjong tiles. As shown in FIG. 15, the virtual application object status plane includes five status sub-planes and four isolation regions. The five status sub-planes respectively correspond to the five object types: "Character", "Bamboo", "Dot", "Wind", and "Dragon". The isolation regions are 0-value columns and include four rectangular regions. Current status information represented in the rectangular regions is 0, and the isolation regions are located between two adjacent status sub-planes.

The virtual application object status plane is a 4*38 rectangular array. Regions in a $10^{th}$ column, a $20^{th}$ column, a $30^{th}$ column, and a $35^{th}$ column from left to right are all the isolation regions. Status sub-planes in a $1^{st}$ column to a $9^{th}$ column from left to right correspond to the object type "Character", status sub-planes in an $11^{th}$ column to a $19^{th}$ column correspond to the object type "Bamboo", status sub-planes in a $21^{st}$ column to a $29^{th}$ column correspond to the object type "Dot", status sub-planes in a $31^{st}$ column to a $34^{th}$ column correspond to the object type "Wind", and status sub-planes in a $36^{th}$ to a $38^{th}$ column correspond to the object type "Dragon".

Figure 16:
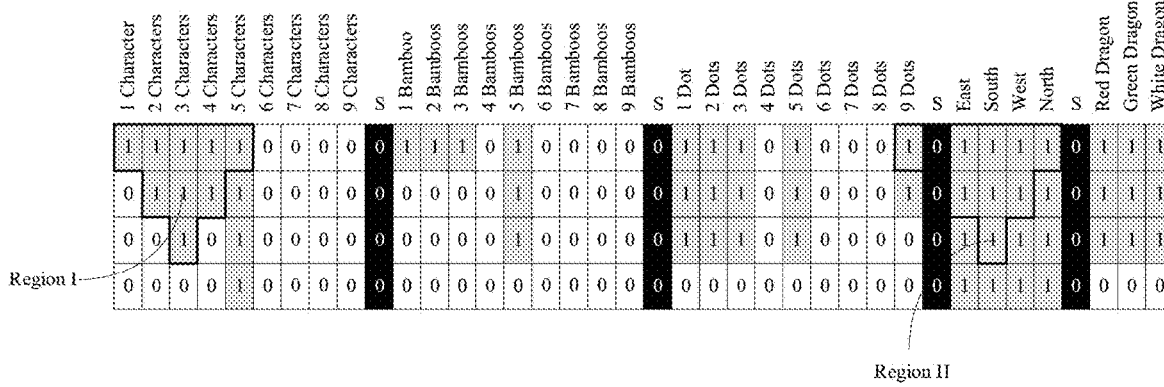
FIG. 16 is a second diagram of the second type of virtual application object status plane according to an embodiment.

FIG. 16 is a second diagram of the second type of virtual application object status plane according to an embodiment. In this case, as shown in FIG. 16, the region I in the virtual application object status plane may represent the scoring type of "Pure Shifted Chows". The shape of the region II is different from that of the region I due to the isolation effect of the isolation regions, thereby reducing the possibility of misjudgment of scoring types.

In an embodiment, the virtual application object status plane including the isolation regions shown in FIG. 15 may be obtained by transforming a status plane that does not include the isolation regions shown in FIG. 12. Specifically, operation S202 may include constructing a first initial status plane based on the current status information, segmenting the first initial status plane into the plurality of status sub-planes based on the object types, and inserting each isolation region between the two adjacent status sub-planes to obtain the virtual application object status plane.

During application, for example, a first initial status plane shown in FIG. 12 may be constructed first based on the current status information of the virtual mahjong tiles, and then the first initial status plane is divided into five status sub-planes based on five object types of "Character", "Bamboo", "Dot", "Wind", and "Dragon". Each of the status sub-planes corresponds to an object type. Then a column of isolation regions are inserted between two adjacent status sub-planes to obtain the virtual application object status plane shown in FIG. 15.

In an embodiment, there are a plurality of methods for constructing the virtual application object status plane shown in FIG. 15. This application is not limited to the methods provided above.

Figure 17:
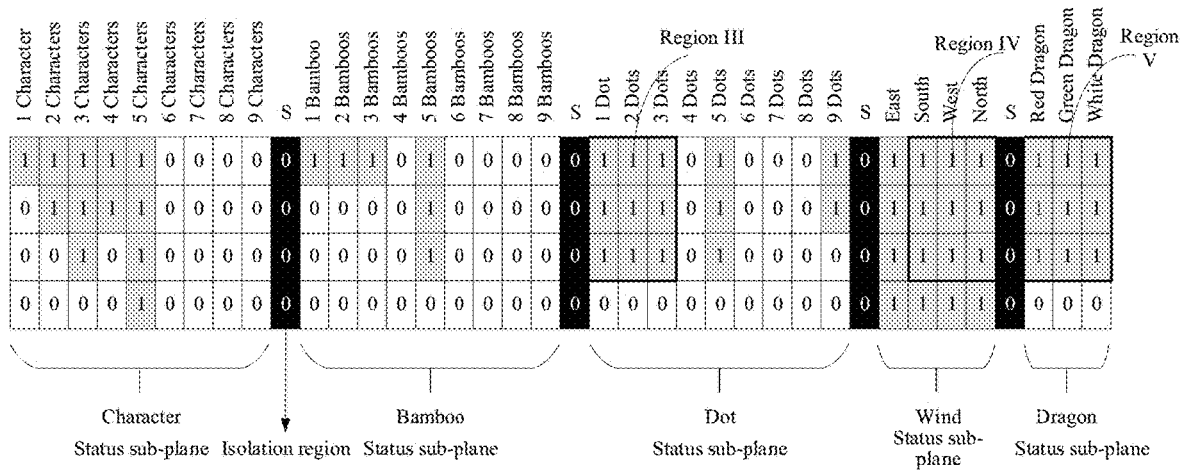
FIG. 17 is a third diagram of the second type of virtual application object status plane according to an embodiment.

FIG. 17 is a third diagram of the second type of virtual application object status plane according to an embodiment. In an embodiment, in the virtual application object status plane constructed according to the foregoing method, misjudgment of scoring types may still occur. As shown in FIG. 17, a region III may represent a scoring type "Pure Triple Chow". Although a shape of a region IV is the same as that of the region III, it is not a representation form of the scoring type "Pure Triple Chow" but a representation form of a scoring type "Big Three Winds". Although a shape of a region V is the same as that of the region III, the region V is not a representation form of the scoring type "Pure Triple Chow" but a representation form of a scoring type "Big Three Dragons", which causes difficulties in subsequent model learning.

Therefore, isolation regions may be added between status sub-planes to be isolated in the virtual application object status plane, to more strictly distinguish between the virtual application objects to be isolated, thereby resolving the misjudgment of scoring types. Specifically, operation S202 may include determining a target object type from the plurality of object types to be isolated, the target object type including a plurality of target object sub-types, and constructing the virtual application object status plane based on the current status information, the object types, and the target object sub-types. Each of the status sub-planes in the virtual application object status plane may include a plurality of isolated status regions, the isolated status regions correspond to the target object sub-types, and each isolation region in the virtual application object status plane may be located between two adjacent isolated status regions.

During application, for example, when the virtual application is an online mahjong game application and the virtual application object is a virtual mahjong tile, two target object types "Wind" and "Dragon" to be isolated may be determined from the five object types of "Character", "Bamboo", "Dot", "Wind", and "Dragon", the target object type "Wind" is divided into four target object sub-types of "East", "South", "West", and "North", and the target object type "Dragon" is divided into three target object sub-types of "Red Dragon", "Green Dragon", and "White Dragon".

Figure 18:
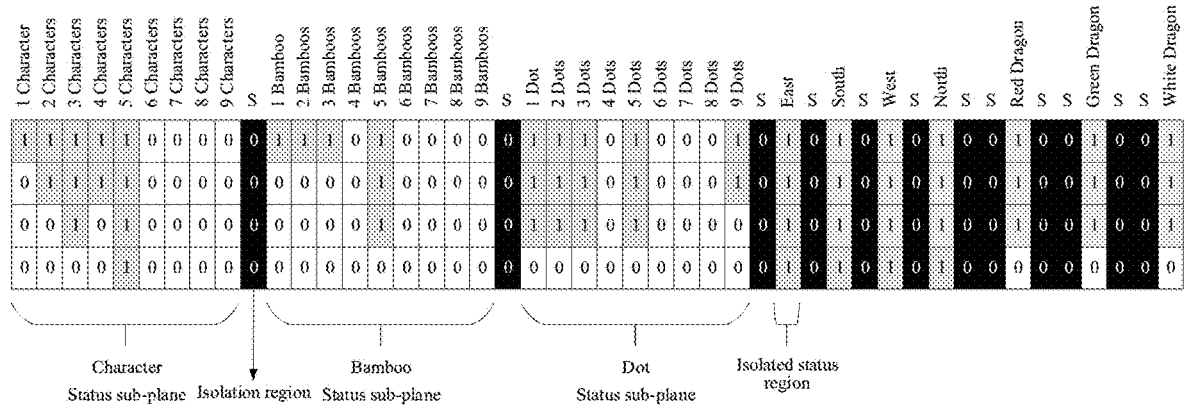
FIG. 18 is a first diagram of a third type of virtual application object status plane according to an embodiment.

FIG. 18 is a first diagram of a third type of virtual application object status plane according to an embodiment. A virtual application object status plane may be constructed based on the current status information, the object types, and the target object sub-types. As shown in FIG. 18, the virtual application object status plane includes three status sub-planes, seven isolated status regions, and nine isolation regions. The three status sub-planes respectively correspond to three object types of "Character" "Bamboo", and "Dot", and the seven isolated status regions respectively correspond to seven target object sub-types of "East", "South", "West", "North", "Red Dragon", "Green Dragon", and "White Dragon".

The isolation regions are 0-value columns, and are respectively located between status sub-planes corresponding to adjacent object types, between isolated status regions corresponding to adjacent target object sub-types, and between a status sub-plane and an isolated status region adjacent to each other.

The virtual application object status plane is a 4*46 rectangular array. Regions in a $10^{th}$ column, a $20^{th}$ column, a $30^{th}$ column, a $32^{nd}$ column, a $34^{th}$ column, a $36^{th}$ column, a 38th column, a $39^{th}$ column, a $41^{st}$ column, a $42^{nd}$ column, a $44^{th}$ column, and a $45^{th}$ column from left to right are all the isolation regions. Status sub-planes in a $1^{st}$ column to a $9^{th}$ column from left to right correspond to the object type "Character", status sub-planes in an $11^{th}$ column to a $19^{th}$ column correspond to the object type "Bamboo", status sub-planes in a $21^{st}$ column to a $29^{th}$ column correspond to the object type "Dot", an isolated status region in a $31^{st}$ column correspond to the target object sub-type "East", an isolated status region in a $33^{rd}$ column correspond to the target object sub-type "South", an isolated status region in a $35^{th}$ column correspond to the target object sub-type "West", an isolated status region in a $37^{th}$ column correspond to the target object sub-type "North", an isolated status region in a $40^{th}$ column correspond to the target object sub-type "Red Dragon", an isolated status region in a $43^{rd}$ column correspond to the target object sub-type "Green DRAGON", and an isolated status region in a $46^{th}$ column correspond to the target object sub-type "White Dragon".

In an embodiment, because the object type "Wind" and the object type "Dragon" should be strictly distinguished in the plane, the status sub-planes may be isolated by using isolation regions with different region sizes, to strictly distinguish the types. Specifically, operation S202 may include determining a region size of each isolation region between two target object sub-types to be isolated, and constructing the virtual application object status plane based on the current status information, the object types, the target object sub-types, and the region size. Each isolation region of the region size may be included between two isolated status regions in the virtual application object status plane.

During application, for example, a region size of isolation regions between the target object sub-types "East" and "South" may be determined to be 1, a region size of isolation regions between the target object sub-types "North" and "Red Dragon" may be determined to be 2, a region size of isolation regions between the target object sub-types "Red Dragon" and "Green Dragon" may be determined to be 2, and so on. After all region sizes are determined, the virtual application object status plane may be constructed based on the current status information, the object types, the target object sub-types, and the region sizes. As shown in FIG. 18, there is one column of isolation regions between the isolated status region corresponding to "East" and the isolated status region corresponding to "South", and there are two columns of isolation regions between the isolated status region corresponding to "Red Dragon" and the isolated status region corresponding to "Green Dragon". In this case, strict distinction is performed between the object type "Wind" and the object type "Dragon".

In an embodiment, a quantity of columns of the isolation regions is not excessively limited, provided that it is ensured that quantities of columns of isolation regions are different between the isolated status regions corresponding to the target object sub-types to be strictly distinguished.

Figure 19:
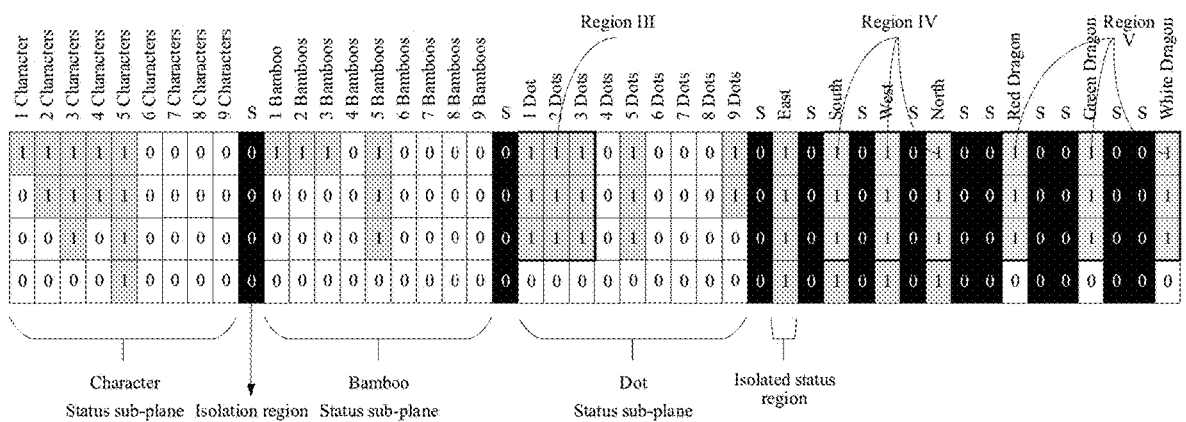
FIG. 19 is a second diagram of the third type of virtual application object status plane according to an embodiment.

FIG. 19 is a second diagram of the third type of virtual application object status plane according to an embodiment. In this case, as shown in FIG. 19, in the virtual application object status plane, the region III may represent the scoring type "Pure Triple Chow", the region IV has a shape different from that of the region III due to an isolation effect of a different quantity of columns of isolation regions, and may represent the scoring type "Big Three Winds", and the region V has a shape different from those of the region III and the region IV due to the isolation effect of a different quantity of columns of isolation regions, and may represent the scoring type "Big Three Dragons". In this way, the possibility of misjudgment of scoring types is reduced.

In an embodiment, the virtual application object status plane including different quantities of columns of isolation regions shown in FIG. 18 may be obtained by transforming the status plane including the same quantity of columns of isolation regions shown in FIG. 15. Specifically, operation S202 may include constructing a second initial status plane based on the current status information and the object types, determining a target status sub-plane corresponding to the target object type in the second initial status plane, segmenting the target status sub-plane into a plurality of isolated status regions based on the target object sub-types, inserting each isolation region of the region size between two adjacent isolated status regions to obtain an isolated initial status plane, and constructing the virtual application object status plane based on the isolated initial status plane and the second initial status plane.

During operation, for example, a second initial status plane shown in FIG. 15 may be constructed based on the current status information and the object types, target status sub-planes corresponding to the target object type "Wind" and the target object type "Dragon" may be determined, the target status sub-planes corresponding to the target object type "Wind" may be divided into four isolated status regions respectively corresponding to the four target object sub-types of "East", "South", "West", and "North", and the target status sub-planes corresponding to the target object type "Dragon" are divided into three isolated status regions respectively corresponding to the three target object sub-types of "Red Dragon", "Green Dragon", and "White Dragon". One column of isolation regions is then inserted among the isolated status regions corresponding to the four target object sub-types of "East", "South", "West", and "North", two columns of isolation regions are inserted among the isolated status regions corresponding to the three target object sub-types of "Red Dragon", "Green Dragon", and "White Dragon", and two columns of isolation regions are inserted between the isolated status regions corresponding to "North" and "Red Dragon", to obtain an isolated initial status plane. Finally, the target status sub-planes corresponding to "Wind" and "Dragon" in the second initial status plane are replaced with the isolated initial status plane, to obtain the virtual application object status plane.

In an embodiment, there are a plurality of methods for constructing the virtual application object status plane shown in FIG. 18. This application is not limited to the methods provided above.

Figure 21A:
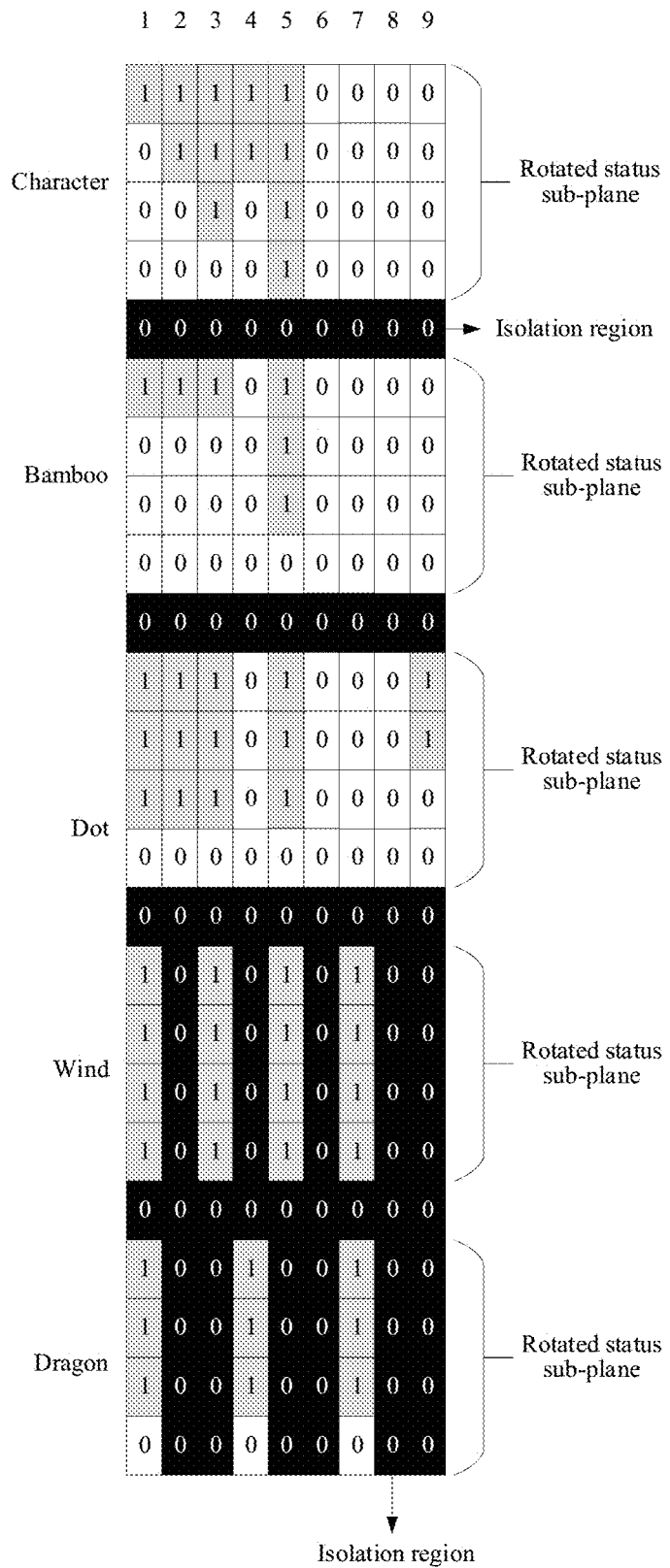
FIG. 21a is a diagram of a fourth type of virtual application object status plane according to an embodiment.
Figure 21B:
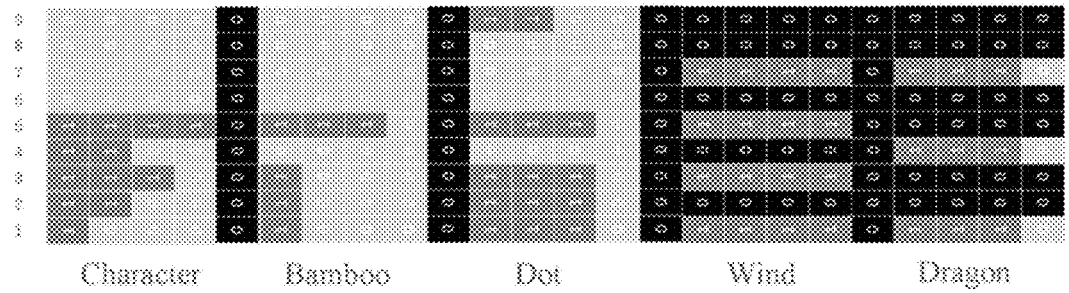
FIG. 21b is a diagram of a fifth type of virtual application object status plane according to an embodiment.

FIG. 21a is a diagram of a fourth type of virtual application object status plane according to an embodiment. FIG. 21b is a diagram of a fifth type of virtual application object status plane according to an embodiment. In an embodiment, since a smaller length and width difference of a rectangular plane indicates a larger suitability for learning of a neural network, the plane may be rotated to reduce the length and width difference. For example, as shown in FIG. 21a, the virtual application object status plane includes five rotated status sub-planes and a plurality of isolation regions. Each of the rotated status sub-planes corresponds to one object type. The isolation regions isolate different object types and different target object sub-types. In FIG. 21a, the virtual application object status plane is a 9*24 rectangular array. A longitudinal direction represents face values 1 to 9 of the virtual mahjong tiles, and five rotated status sub-planes corresponding to "Character", "Bamboo", "Dot", "Wind", and "Dragon" are in a horizontal direction. It is to be understood that after the plane is rotated, a status plane shown in FIG. 21b, that is, a 24*9 rectangular array may be obtained.

In an embodiment, the virtual application object status planes shown in FIG. 21a and FIG. 21b may alternatively be obtained by transforming the status plane shown in FIG. 18. Specifically, operation S202 may include constructing a third initial status plane based on the current status information, the object types, the target object sub-types, and the region size, segmenting the third initial status plane into a plurality of to-be-rotated status sub-planes based on the object types, rotating the to-be-rotated status sub-planes to obtain rotated status sub-planes, and inserting each isolation region between two adjacent rotated status sub-planes to obtain the virtual application object status plane.

Figure 20:
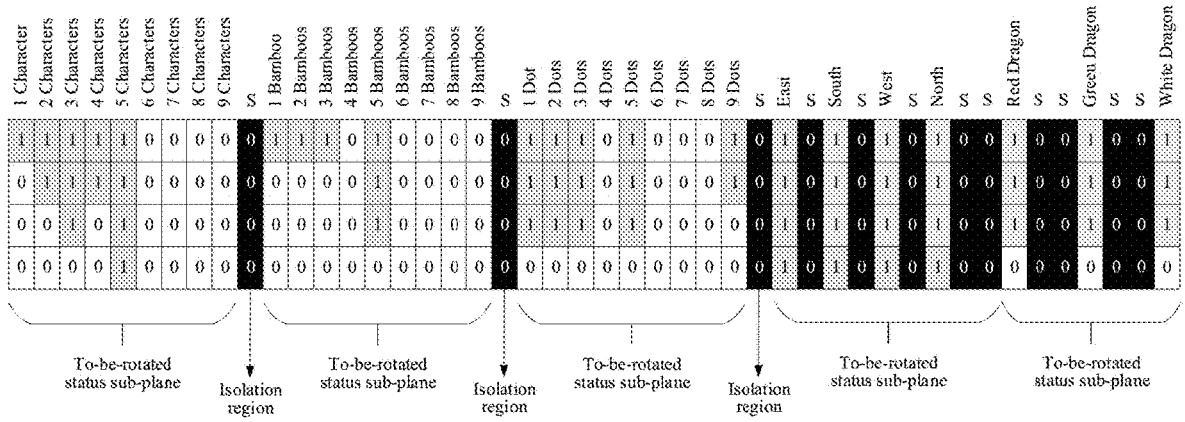
FIG. 20 is a third diagram of the third type of virtual application object status plane according to an embodiment.

FIG. 20 is a third diagram of the third type of virtual application object status plane according to an embodiment. During operation, for example, a third initial status plane shown in FIG. 20 may be constructed based on the current status information, the object types, the target object sub-types, and the region sizes, and then the third initial status plane is divided into five to-be-rotated status sub-planes and three isolation regions based on the five object types of "Character", "Bamboo", "Dot", "Wind", and "Dragon". The to-be-rotated status sub-planes are then rotated to obtain five rotated status sub-planes, and a 2*4 isolation region is added to the rotated sub-plane corresponding to "Dragon", so that the five rotated status sub-planes may be spliced into a rectangle, and then one column of isolation regions is inserted between two adjacent rotated status sub-planes to obtain the virtual application object status plane.

In an embodiment, there are a plurality of methods for constructing the virtual application object status planes shown in FIG. 21a and FIG. 21b. The disclosure is not limited to the method provided above.

In the virtual application object status planes shown in FIG. 21a and FIG. 21b, the isolation regions are inserted in a width direction and a height direction respectively to reduce a possibility of confusion among a plurality of scoring sub-types in the status plane, thereby reducing the possibility of misjudgment of scoring types. In addition, the whole status plane is more approximate to a square, facilitating the learning of the neural network.

In operation S203, the system outputs probabilities respectively corresponding to the plurality of to-be-outputted virtual application objects based on the virtual application object status plane.

The to-be-outputted virtual application objects may be virtual application objects that are set based on game rules and that may be outputted. For example, when the virtual application is an online mahjong game application and the virtual application object is a virtual mahjong tile, the to-be-outputted virtual application objects may be virtual mahjong tiles that can be played by a current player.

Figure 7:
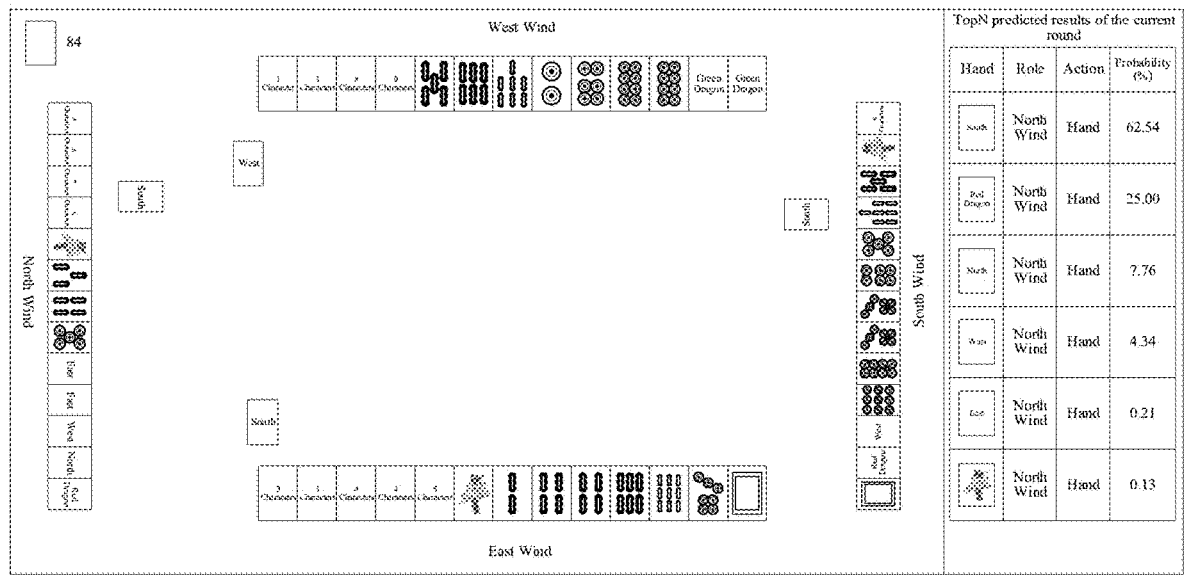
FIG. 7 is a diagram of a first interface of an online mahjong game application according to an embodiment.

FIG. 7 is a diagram of a first interface of an online mahjong game application according to an embodiment. During operation, for example, after the virtual application object status plane is constructed, an output probability corresponding to each of the to-be-outputted virtual application objects may be determined based on the virtual application object status plane. As shown in FIG. 7, after the output probability corresponding to each of the to-be-outputted virtual application objects is determined, the output probability may be further displayed in a form of a table on a game interface. For example, a probability that a player North outputs a to-be-outputted virtual application object "South" is 62.54%, a probability that the player North outputs a to-be-outputted virtual application object "Red Dragon" is 25%, and so on.

In an embodiment, as shown in FIG. 7, the output probability corresponding to each of the to-be-outputted virtual application objects may be displayed on the game interface in a form of a list, and a to-be-outputted virtual application object with an excessively low probability may be omitted, and so on, to improve flexibility of game interface displaying.

In an embodiment, to improve calculation efficiency and accuracy, the virtual application object status plane may alternatively be calculated by using a neural network. Specifically, operation S203 may include inputting the virtual application object status plane to a probability acquisition network, and acquiring the output probabilities corresponding to the to-be-outputted virtual application objects based on the probability acquisition network.

The probability acquisition network may be a neural network. The neural network may be an algorithmic mathematical model for distributed parallel information processing by imitating behavioral characteristics of an animal neural network. The neural network implements processing of information by adjusting an interconnection among a large quantity of internal nodes based on the complexity of a system.

In an embodiment, an example is used for description in which the probability acquisition network is a convolutional neural network (CNN) model. Basic components of the CNN model include a convolutional layer, a pooling layer, a fully connected layer, and the like. The convolutional layer, the pooling layer, and the like may form a convolutional block, and a plurality of convolutional blocks are connected to a plurality of fully connected layers to form a CNN structure. However, in other embodiments, the probability acquisition network may alternatively be another multi-classification model framework such as a recurrent neural network (RNN), a deep neural network (DNN), a random forest model, or a support vector machine (SVM), and an embodiment is not limited thereto.

During operation, for example, the virtual application object status plane may be inputted to a CNN. The CNN may be referred to as a probability acquisition network. An output probability that the to-be-outputted virtual application object may be controlled by a current player for outputting may be calculated by using the probability acquisition network.

In an embodiment, the virtual application object status plane may be considered as a matrix of pixel values. Because the virtual application object status plane includes only two types of current status information of 0 and 1, the virtual application object status plane is a binary image.

The probability acquisition network may include a plurality of convolutional layers. A convolutional operation may be performed on an inputted image by using the convolutional layers. Through the convolutional operation, features of the image may be learned from inputted image data, and a spatial relationship between pixels may be preserved. During the convolutional operation, a convolution kernel moves in the inputted image at a specific step, performs a convolutional operation, and may then output features corresponding to the image. Therefore, after the virtual application object status plane is inputted to the probability acquisition network, feature extraction may be performed on the virtual application object status plane by using the convolutional layers in the probability acquisition network.

After features corresponding to the virtual application object status plane are extracted, the output probability corresponding to the to-be-outputted virtual application object may be determined by using the fully connected layer. The fully connected layer may map the learned features to a sample label space, which serves as a "classifier" in the network model. Each node of the fully connected layer is connected to a node outputted in a previous layer. A node of the fully connected layer is referred to as a neuron in the fully connected layer. A quantity of neurons in the fully connected layer may be determined based on actual application requirements. A core operation of the fully connected layer is a matrix-vector product, which is essentially a linear transformation from one feature space to another feature space. The fully connected layer may be located in last few layers in the probability acquisition network to weight and sum previously acquired features.

In an embodiment, to improve network performance of the probability acquisition network, each of the neurons in the fully connected layer may further use a rectified linear unit (ReLU) function. Output values of a last fully connected layer is transferred to an output, and may be classified by using a softmax layer. After classification, an output probability corresponding to each of the to-be-outputted virtual application objects that the to-be-outputted virtual application object may be controlled by the current player for outputting may be calculated.

Figure 9:
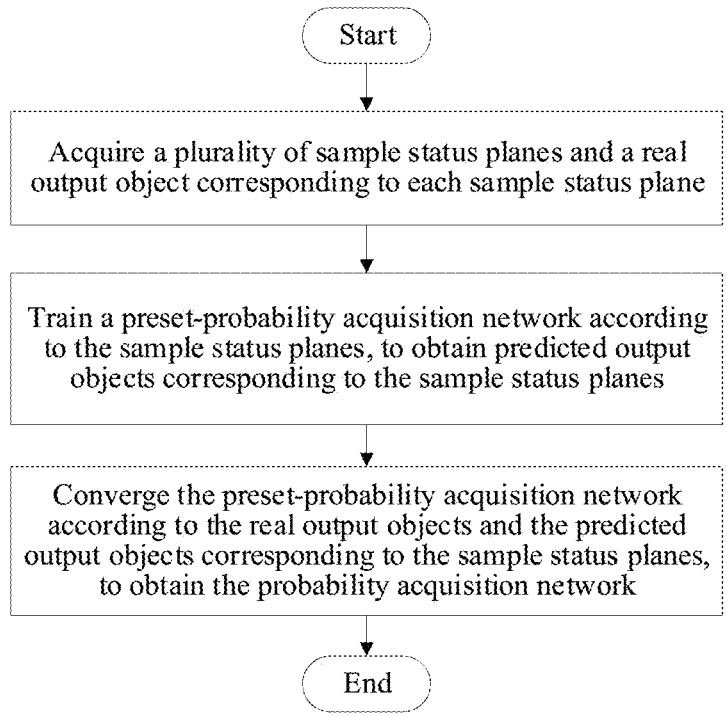
FIG. 9 is a flowchart of training a probability acquisition network according to an embodiment.

FIG. 9 is a flowchart of training a probability acquisition network according to an embodiment. In an embodiment, to improve the accuracy of determining the output probability by the probability acquisition network, the probability acquisition network may be further trained. Specifically, the method show in FIG. 9 for outputting a virtual application object may further include acquiring a plurality of sample status planes and real output objects corresponding to the sample status plane straining a preset-probability acquisition network based on the sample status planes, to obtain predicted output objects corresponding to the sample status planes, and converging the preset-probability acquisition network based on the real output objects and the predicted output objects corresponding to the sample status planes, to obtain the probability acquisition network.

During operation, for example, as shown in FIG. 9, previously stored game logs may be acquired and sorted. All game actions performed by all players from the beginning to the end of the game may be recorded in the game logs, and the information in the game logs may be organized into a plurality of sample status images. In addition, a plurality of important target game actions are determined from the plurality of game actions. The target game actions may be used as real output objects. For example, a game action of outputting "Red Dragon" by a current player may be identified as a target game action. A plurality of sample status images before the target game action are then acquired. For example, 100 sample status images before the target game action may be acquired. In this case, the 100 sample status images all correspond to the target game action, that is, one real output object may correspond to a plurality of sample status planes. A representation form of the sample status plane may be the same as that of the virtual application object status plane.

A preset-probability acquisition network may then be trained based on the acquired plurality of acquired sample status planes to obtain predicted output objects corresponding to the sample status planes, and model parameters of the preset-probability acquisition network are converged based on the real output objects and the predicted output objects corresponding to the sample status planes. When a calculated degree of matching between the predicted output objects and the real output objects satisfies a preset threshold, it indicates that training of the probability acquisition network is completed, and a trained probability acquisition network may be obtained.

Referring back to FIG. 2, in operation S204, the system determines a target virtual application object from the plurality of to-be-outputted virtual application objects based on the output probabilities respectively corresponding to the plurality of to-be-outputted virtual application objects for outputting.

During operation, for example, the probability acquisition network may output the output probability corresponding to each of the to-be-outputted virtual application objects, and may then perform sampling based on an acquired probability distribution, to determine a target virtual application object from the plurality of to-be-outputted virtual application objects, and output the target virtual application object.

In an embodiment, the network device may output the target virtual application object in a plurality of manners. For example, when the method for outputting a virtual application object is applied to a virtual player on a computer side, the method can directly help the virtual player on the computer side output the target virtual application object, thereby advancing a game process.

In another example, when the method for outputting a virtual application object is applied to a real player in a user terminal, after a target virtual application object is determined, a virtual mahjong tile corresponding to the target virtual application object on the game interface may be highlighted, for example, the virtual mahjong tile may be flashed or marked with a different color. In this case, the user may learn that outputting the virtual mahjong tile may advance the game process. The user may choose to output the specially marked virtual mahjong tile. Certainly, the user may alternatively choose other virtual mahjong tiles for outputting for other considerations, thereby improving flexibility of the game.

In an embodiment, the game may not be over after the target virtual application object is outputted. In this case, the current status information may be updated, and the target virtual application object may be redetermined. Specifically, after operation S204, the method may further include, updating the to-be-outputted virtual application objects, updating the current status information of the virtual application objects when the to-be-outputted virtual application objects do not satisfy an end condition, returning to the step of constructing the virtual application object status plane based on the current status information of the plurality of virtual application objects, and ending the outputting when the to-be-outputted virtual application objects satisfy the end condition.

During operation, for example, when the virtual application is an online mahjong game application and the virtual application object is a virtual mahjong tile, after the target virtual application object is outputted, a plurality of to-be-outputted virtual application objects in the virtual application are changed, that is, a tile that has been played cannot be outputted again. In this case, the to-be-outputted virtual application objects may be updated. The updated to-be-outputted virtual application objects are then analyzed. For example, a plurality of to-be-outputted virtual application objects that may be outputted by a current player may be analyzed. When the to-be-outputted virtual application objects cannot form a tile type for winning, it may be considered that the to-be-outputted virtual application objects do not satisfy an end condition. In this case, the step of constructing the virtual application object status plane based on the current status information of the plurality of virtual application objects may be returned to, so as to continue to determine the target virtual application object; and when the to-be-outputted virtual application objects can form a tile type for winning, it may be considered that the to-be-outputted virtual application objects satisfy the end condition.

Figure 8:
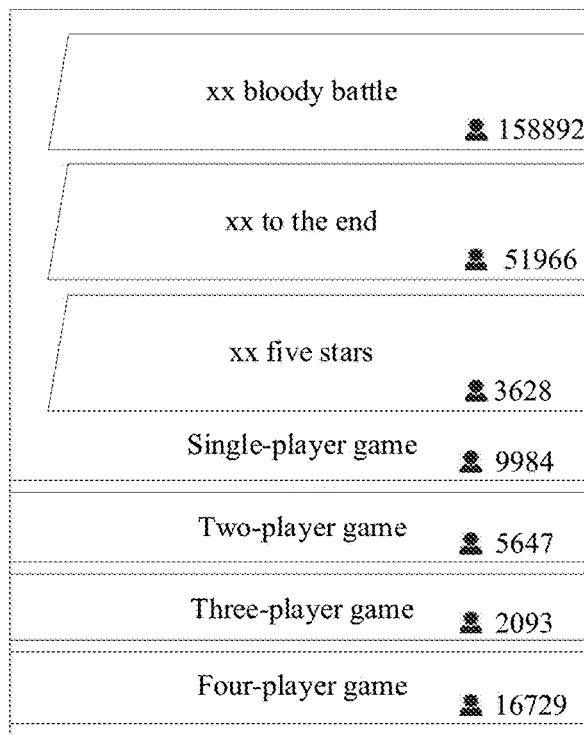
FIG. 8 is a diagram of a second interface of the online mahjong game application according to an embodiment.

FIG. 8 is a diagram of a second interface of the online mahjong game application according to an embodiment. In an embodiment, as shown in FIG. 8, due to accuracy and flexibility, the method for outputting a virtual application object is applicable to virtual applications corresponding to various game rules such as "xx Bloody Battle", "xx to the end", and "xx five stars", and is further applicable to various game forms such as a "single-player game", a "two-player game", a "three-player game", and a "four-player game". A user may team up with other users to play a game, improving fun of the game.

According to an embodiment, the current status information of the plurality of virtual application objects in the virtual application may be acquired, the current status information indicating that a virtual application object is in a known state or an unknown state. The virtual application object status plane may be constructed based on the current status information of the plurality of virtual application objects. The virtual application object status plane may include the region corresponding to each virtual application object. The region may include the current status information of the corresponding virtual application object. The output probabilities may respectively correspond to the plurality of to-be-outputted virtual application objects are determined based on the virtual application object status plane. The target virtual application object may be determined from the plurality of to-be-outputted virtual application objects based on the output probabilities respectively corresponding to the plurality of to-be-outputted virtual application objects for outputting. In this embodiment, the current status information of the virtual application objects in the virtual application is represented by using a status plane, so that the current status information of the virtual application objects can be concisely and accurately represented in the status plane, thereby facilitating identification and learning of the neural network to determine the output probability corresponding to the to-be-outputted virtual application object. In this embodiment, the to-be-rotated status sub-plane may be rotated, so that the entire status plane is more approximate to a square, thereby facilitating the learning of the neural network. Moreover, in this embodiment, the virtual application objects to be distinguished between each other are strictly distinguished between each other by inserting the isolation region in the status plane, which reduces the possibility of misjudgment of scoring types, thereby improving the accuracy of outputting a target virtual application object.

According to the method described in the foregoing embodiment, further detailed description is provided below by using an example in which the apparatus for outputting a virtual application object is specifically integrated in the network device.

Figure 3:
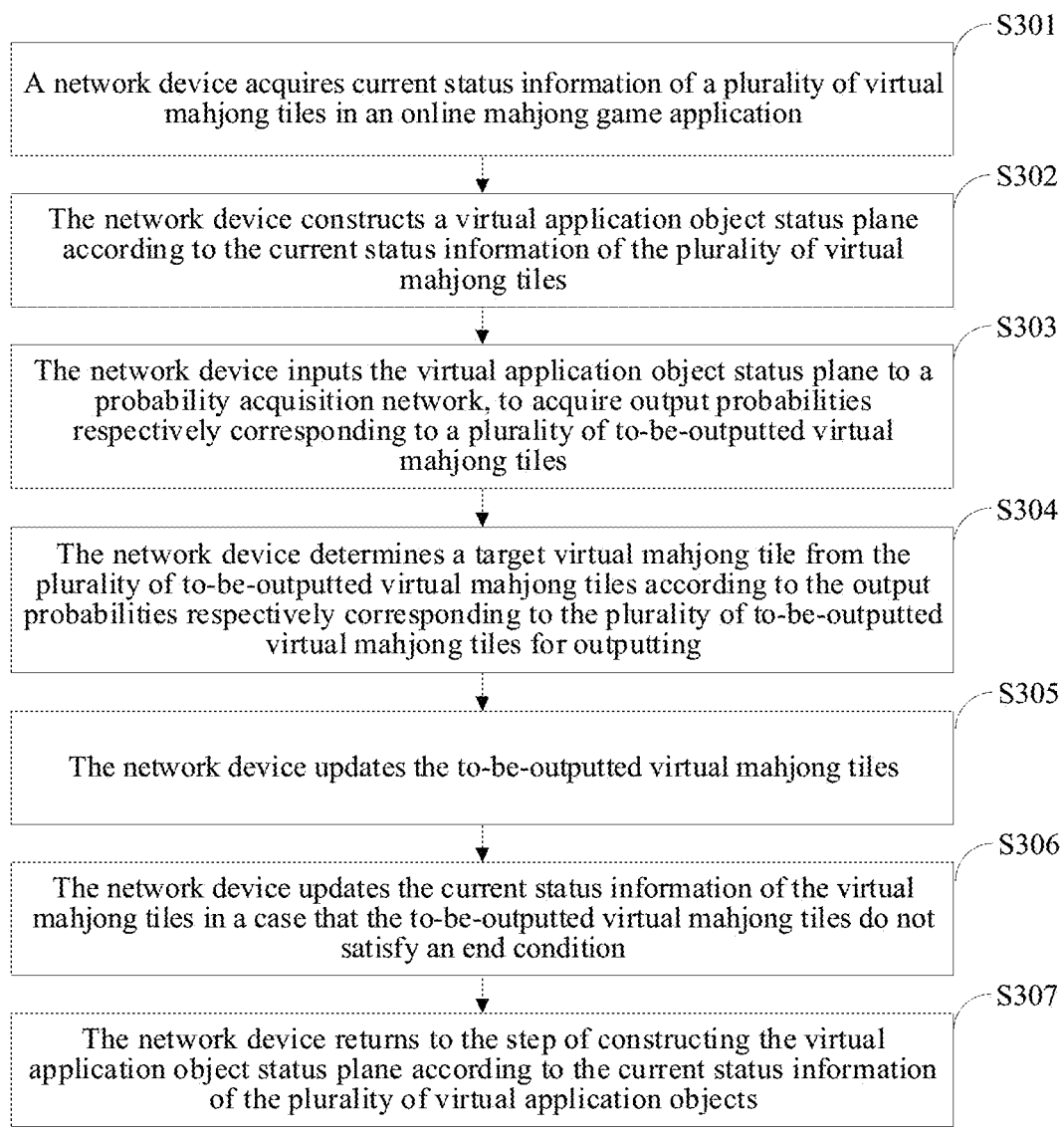
FIG. 3 is a second flowchart of the method for outputting a virtual application object according to an embodiment.

FIG. 3 is a second flowchart of the method for outputting a virtual application object according to an embodiment. Referring to FIG. 3, a process of the method for outputting a virtual application object in the embodiments may be as follows.

In operation S301, a network device acquires current status information of a plurality of virtual mahjong tiles in an online mahjong game application.

Figure 10:
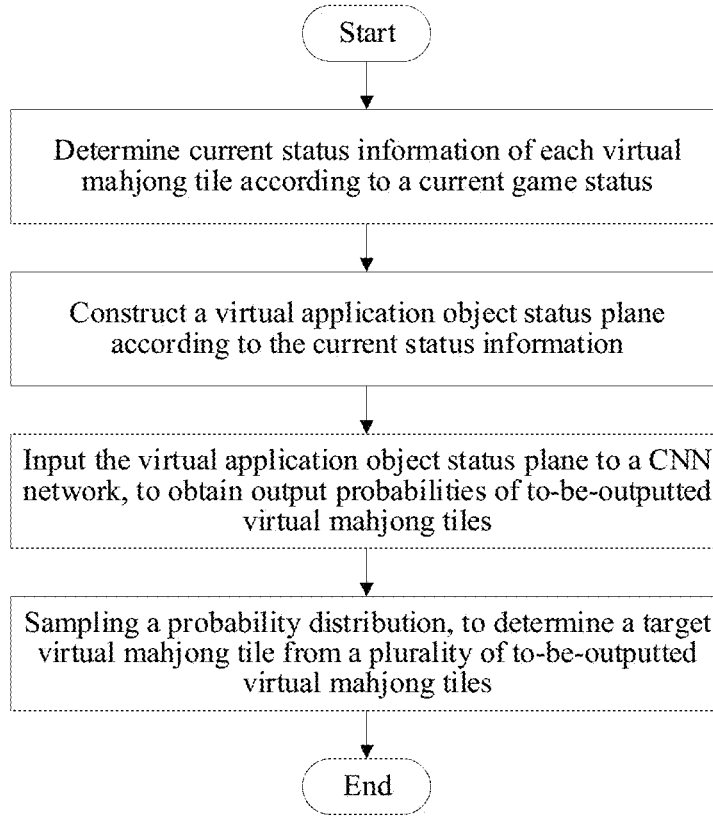
FIG. 10 is a flowchart of outputting a target virtual application object by using a probability acquisition network according to an embodiment.

FIG. 10 is a flowchart of outputting a target virtual application object by using a probability acquisition network according to an embodiment. During operation, as shown in FIG. 10, the network device may determine, based on a current game status in the online mahjong game application, whether each of the virtual mahjong tile is in a known state or in an unknown state, and may define virtual mahjong tiles that are known such as virtual mahjong tiles known to a current player, virtual mahjong tiles outputted by each player, and virtual mahjong tiles displayed by other players as a known state. When a virtual mahjong tile is in a known state, current status information corresponding to the virtual mahjong tile may be "1", and virtual mahjong tiles in other locations may be defined as an unknown state. When the virtual mahjong tile is unknown, the current status information corresponding to the virtual mahjong tile may be "0".

In operation S302, the network device constructs a virtual application object status plane based on the current status information of the plurality of virtual mahjong tiles.

During operation, as shown in FIG. 10, the network device may construct the virtual application object status plane shown in FIG. 12 based on the current status information corresponding to each of the virtual mahjong tiles. The virtual application object status plane includes a plurality of rectangular regions. Each of the rectangular regions represents one virtual mahjong tile. The plurality of rectangular regions are arranged based on mahjong tile names of virtual mahjong tiles corresponding to the regions in an order of "1 Character, 2 Characters, 3 Characters, 4 Characters, 5 Characters, 6 Characters, 7 Characters, 8 Characters, 9 Characters, 1 Bamboo, 2 Bamboos, 3 Bamboos, 4 Bamboos, 5 Bamboos, 6 Bamboos, 7 Bamboos, 8 Bamboos, 9 Bamboos, 1 Dot, 2 Dots, 3 Dots, 4 Dots, 5 Dots, 6 Dots, 7 Dots, 8 Dots, 9 Dots, East, South, West, North, Red Dragon, Green Dragon, and White Dragon". The overall arrangement is a 4*34 rectangular array. Each row in the rectangular array includes 34 virtual mahjong tiles with different names, and each column in the rectangular array includes 4 virtual mahjong tiles with the same name. Each of the rectangular regions includes current status information "0" or "1" of a virtual mahjong tile corresponding to the rectangular region.

In operation S303, the network device inputs the virtual application object status plane to a probability acquisition network, to acquire output probabilities respectively corresponding to the plurality of to-be-outputted virtual mahjong tiles.

During operation, as shown in FIG. 10, after the virtual application object status plane is acquired, the virtual application object status plane may be inputted to a CNN network. The CNN network may be a probability acquisition network, and acquires an output probability corresponding to each of the to-be-outputted virtual mahjong tiles that the to-be-outputted virtual mahjong tile may be outputted by a current player. As shown in FIG. 7, a probability that a current player North Wind outputs a virtual mahjong tile "South" is 62.54%, a probability that the current player North Wind outputs a virtual mahjong tile "Red Dragon" is 25%, a probability that the current player North Wind outputs a virtual mahjong tile "North" is 7.76%, a probability that the current player North Wind outputs a virtual mahjong tile "West" is 4.34%, a probability that the current player North Wind outputs a virtual mahjong tile "East" is 0.21%, a probability that the current player North Wind outputs a virtual mahjong tile "Little chick" is 0.13%, and so on.

In operation S304, the network device determines a target virtual mahjong tile from the plurality of to-be-outputted virtual mahjong tiles based on the output probabilities respectively corresponding to the plurality of to-be-outputted virtual mahjong tiles for outputting.

During operation, as shown in FIG. 10, after the output probability corresponding to each of the to-be-outputted virtual mahjong tiles is obtained, a probability distribution may be sampled, to determine the target virtual mahjong tile from the plurality of to-be-outputted virtual mahjong tiles, and the target virtual mahjong tile is outputted.

In operation S305, the network device updates the to-be-outputted virtual mahjong tiles.

During operation, after the network device outputs the target virtual mahjong tile, the to-be-outputted virtual mahjong tiles have changed. In this case, the to-be-outputted virtual mahjong tiles may be updated to analyze the updated to-be-outputted virtual mahjong tiles.

In operation S306, the network device updates the current status information of the virtual mahjong tiles when the to-be-outputted virtual mahjong tiles do not satisfy an end condition.

During operation, when to-be-outputted virtual mahjong tiles that may be controlled by a current player cannot form a tile type for winning, the game continues, and the network device may update the current status information of each of the virtual mahjong tiles in the current game based on a current game status.

In operation S307, the network device returns to the step of constructing the virtual application object status plane based on the current status information of the plurality of virtual application objects.

During operation, after the current status information of each of the virtual mahjong tile is updated, the step of constructing the virtual application object status plane based on the current status information of the plurality of virtual application objects may be returned to, so as to continue to identify the target virtual application object, until the to-be-outputted virtual mahjong tiles that may be controlled by the current player have formed the tile type for winning. In this case, the game may stop.

According to an embodiment, the current status information of the plurality of virtual mahjong tiles in the online mahjong game application may be acquired by using the network device, the virtual application object status plane may be constructed based on the current status information of the plurality of virtual mahjong tiles, the virtual application object status plane may be inputted to the probability acquisition network to obtain the output probabilities respectively corresponding to the plurality of to-be-outputted virtual mahjong tiles, the target virtual mahjong tile may be determined from the plurality of to-be-outputted virtual mahjong tiles based on the output probabilities respectively corresponding to the plurality of to-be-outputted virtual mahjong tiles for outputting, and the to-be-outputted virtual mahjong tiles may be updated. When the to-be-outputted virtual mahjong tiles do not satisfy the end condition, the current status information of the virtual mahjong tiles is updated, and the step of constructing the virtual application object status plane based on the current status information of the plurality of virtual mahjong tiles is returned to. In this embodiment, the current status information of the virtual application objects in the virtual application is represented by using a status plane, so that the current status information of the virtual application objects can be concisely and accurately represented in the status plane, thereby facilitating identification and learning of the neural network to accurately determine the output probabilities corresponding to the to-be-outputted virtual application objects, and improving the accuracy of outputting a target virtual application object.

According to the method described in the foregoing embodiment, further detailed description is provided below by using an example in which the apparatus for outputting a virtual application object is specifically integrated in the network device.

Figure 4:
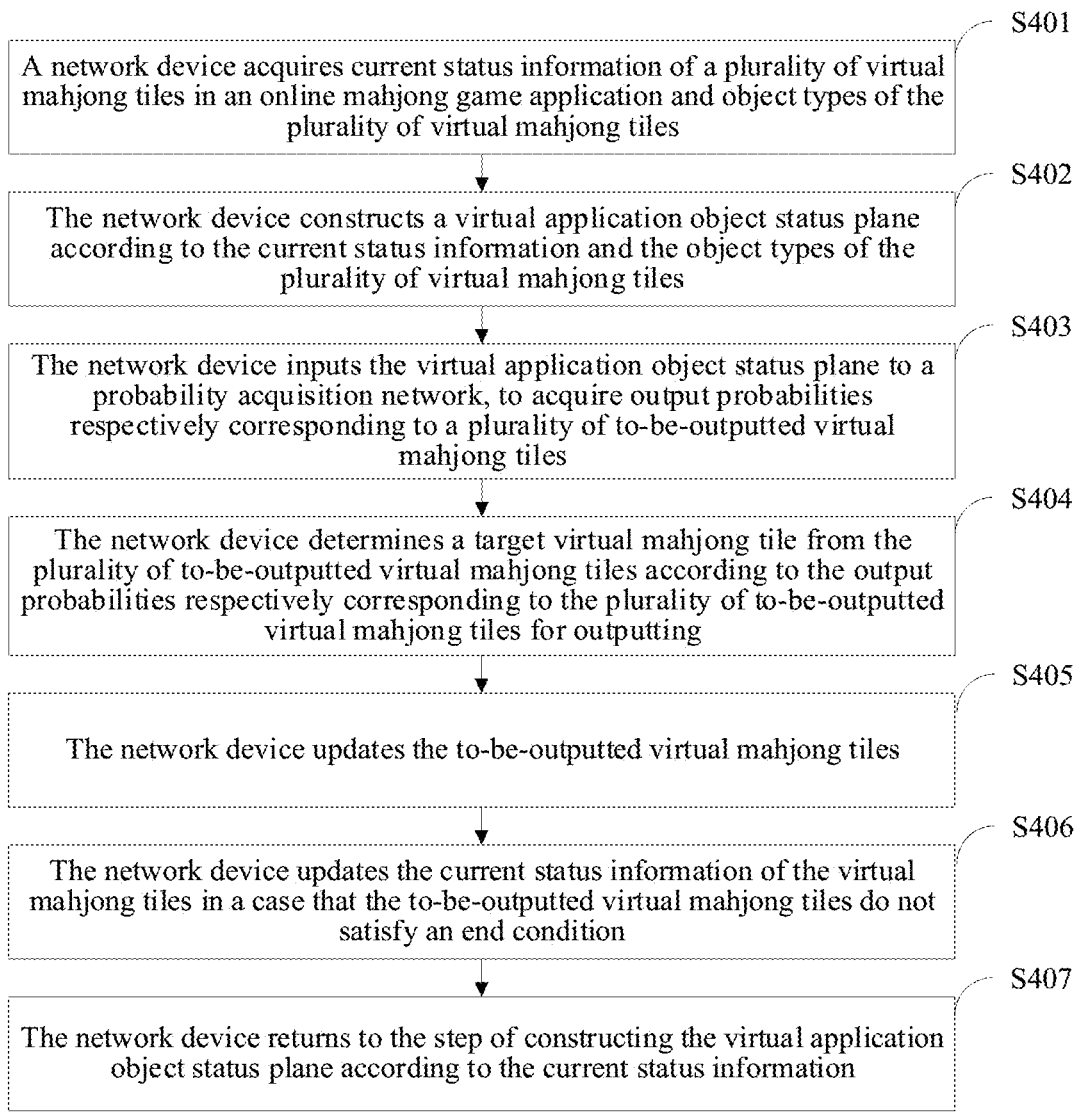
FIG. 4 is a third flowchart of the method for outputting a virtual application object according to an embodiment.

FIG. 4 is a third flowchart of the method for outputting a virtual application object according to an embodiment. Referring to FIG. 4, a specific process of the method for outputting a virtual application object in the embodiments may be as follows:

In operation S404, a network device acquires current status information of a plurality of virtual mahjong tiles in an online mahjong game application and object types of the plurality of virtual mahjong tiles.

During operation, the network device may acquire current status information "0" or "1" of each of the virtual mahjong tiles in the online mahjong game application, classifies the virtual mahjong tiles into five object types of "Character", "Bamboo", "Dot", "Wind", and "Dragon" based on mahjong tile names of the virtual mahjong tiles, and determine an object type corresponding to each of the virtual mahjong tiles.

402. The network device constructs a virtual application object status plane based on the current status information and the object types of the plurality of virtual mahjong tiles.

During operation, the network device may construct the virtual application object status plane shown in FIG. 15 based on the current status information and the object type corresponding to each of the virtual mahjong tiles. The virtual application object status plane is a 4*38 rectangular array. Regions in a 10th, a $20^{th}$ column, a $30^{th}$ column, and a $35^{th}$ column from left to right are all isolation regions. Status sub-planes in a $1^{st}$ column to a $9^{th}$ column from left to right correspond to the object type "Character", status sub-planes in an $11^{th}$ column to a $19^{th}$ column correspond to the object type "Bamboo", status sub-planes in a $21^{st}$ column to a $29^{th}$ column correspond to the object type "Dot", status sub-planes in a $31^{st}$ column to a $34^{th}$ column correspond to the object type "Wind", and status sub-planes in a $36^{th}$ to a $38^{th}$ column correspond to the object type "Dragon".

In operation S403, the network device inputs the virtual application object status plane to a probability acquisition network, to acquire output probabilities respectively corresponding to the plurality of to-be-outputted virtual mahjong tiles.

In operation S404, the network device determines a target virtual mahjong tile from the plurality of to-be-outputted virtual mahjong tiles based on the output probabilities respectively corresponding to the plurality of to-be-outputted virtual mahjong tiles for outputting.

In operation S405, the network device updates the to-be-outputted virtual mahjong tiles.

In operation S406, the network device updates the current status information of the virtual mahjong tiles when the to-be-outputted virtual mahjong tiles do not satisfy an end condition.

In operation S407, the network device returns to the step of constructing the virtual application object status plane based on the current status information.

The foregoing step of determining the target virtual application object based on the neural network has been described above, so the details will not be described herein again.

According to an embodiment, the current status information and the object types of the plurality of virtual mahjong tiles in the online mahjong game application may be acquired by using the network device, the virtual application object status plane may be constructed based on the current status information and the object types of the plurality of virtual mahjong tiles, the virtual application object status plane may be inputted to the probability acquisition network to obtain the output probability of the to-be-outputted virtual mahjong tile, the target virtual mahjong tile may be determined from the plurality of to-be-outputted virtual mahjong tiles based on the output probability of the to-be-outputted virtual mahjong tile for outputting, and the to-be-outputted virtual mahjong tiles may be updated. When the to-be-outputted virtual mahjong tile does not satisfy the end condition, the current status information of the virtual mahjong tile is updated, and the step of constructing the virtual application object status plane based on the current status information is returned to. In this embodiment, the current status information of the virtual application objects in the virtual application is represented by using a status plane, so that the current status information can be concisely and accurately represented in the status plane, thereby facilitating identification and learning of the neural network to accurately determine the output probabilities corresponding to the to-be-outputted virtual application objects, and improving the accuracy of outputting a target virtual application object.

Figure 5:
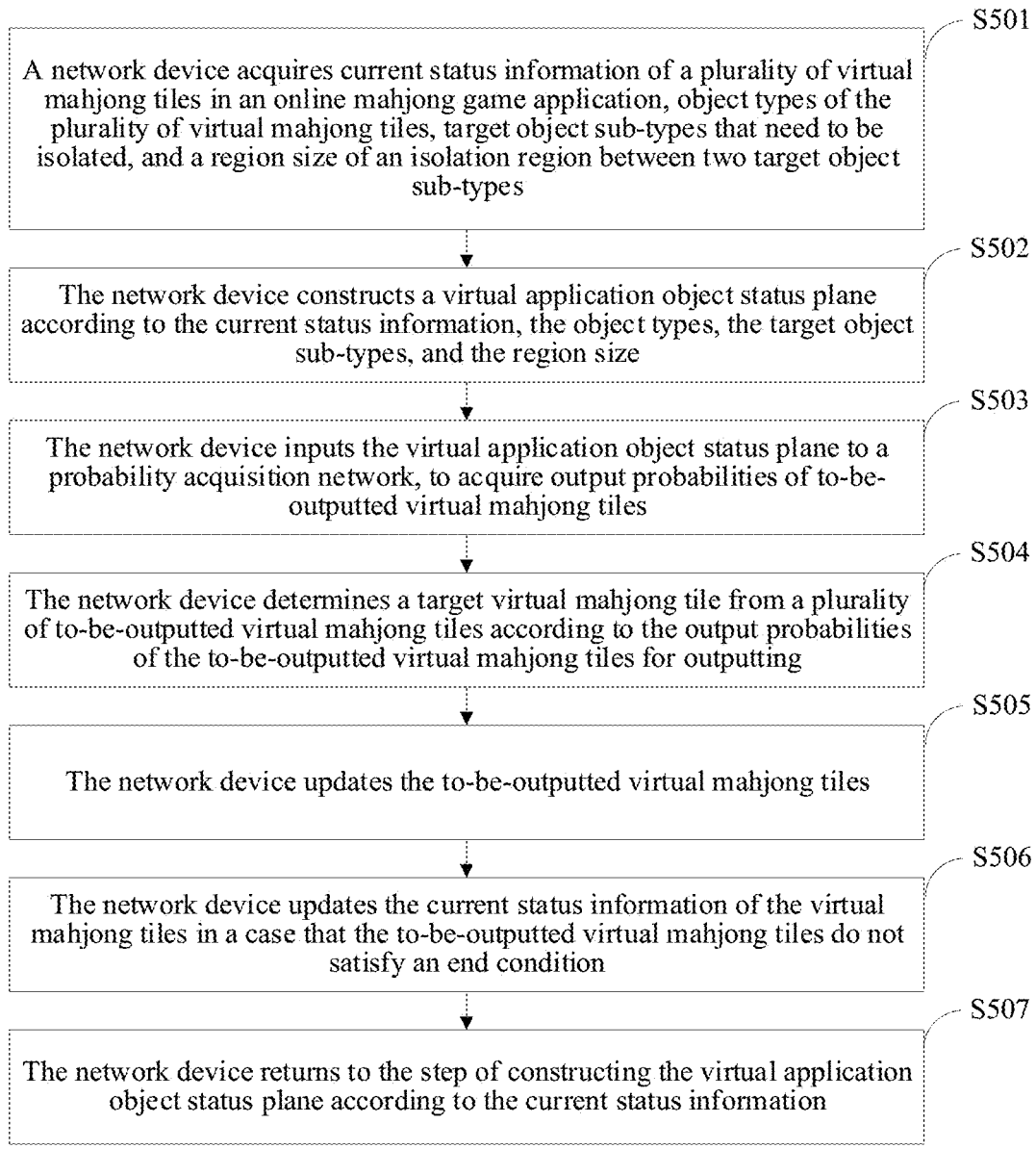
FIG. 5 is a fourth flowchart of the method for outputting a virtual application object according to an embodiment.

FIG. 5 is a fourth flowchart of the method for outputting a virtual application object according to an embodiment. Referring to FIG. 5, a process of the method for outputting a virtual application object in the embodiments may be as follows:

In operation S501, a network device acquires current status information of a plurality of virtual mahjong tiles in an online mahjong game application, object types of the plurality of virtual mahjong tiles, target object sub-types to be isolated, and a region size of an isolation region between two target object sub-types.

During operation, the network device may determine target object types "Wind" and "Dragon" to be isolated from the five object types of "Character", "Bamboo", "Dot", "Wind", and "Dragon", divide the object type "Wind" into four target object sub-types of "East", "South", "West", and "North", and divide the object type "Dragon" into three target object sub-types of "Red Dragon", "Green Dragon", and "White Dragon". In addition, the network device determines a region size of isolation regions between the target object sub-types "East" and "South" to be 1, a region size of isolation regions between the target object sub-types "North" and "Red Dragon" to be 2, a region size of isolation regions between the target object sub-types "Red Dragon" and "Green Dragon" to be 2, and so on.

In operation S502, the network device constructs a virtual application object status plane based on the current status information, the object types, the target object sub-types, and the region size.

During operation, the network device may construct the virtual application object status plane shown in FIG. 18 based on the current status information and the object type corresponding to each of the virtual mahjong tiles, the target object sub-types, and the region size. The virtual application object status plane is a 4*46 rectangular array. Regions in a $10^{th}$ column, a $20^{th}$ column, a $30^{th}$ column, a $32^{nd}$ column, a $34^{th}$ column, a $36^{th}$ column, a $38^{th}$ column, a 39th column, a $41^{st}$ column, a $42^{nd}$ column, a $44^{th}$ column, and a $45^{th}$ column from left to right are all the isolation regions. Status sub-planes in a $1^{st}$ column to a $9^{th}$ column from left to right correspond to the object type "Character", status sub-planes in an $11^{th}$ column to a $19^{th}$ column correspond to the object type "Bamboo", status sub-planes in a $21^{st}$ column to a $29^{th}$ column correspond to the object type "Dot", an isolated status region in a $31^{st}$ column correspond to the target object sub-type "East", an isolated status region in a 33$^{rd}$ column correspond to the target object sub-type "South", an isolated status region in a 35$^{th}$ column correspond to the target object sub-type "West", an isolated status region in a 37$^{th}$ column correspond to the target object sub-type "North", an isolated status region in a 40$^{th}$ column correspond to the target object sub-type "Red Dragon", an isolated status region in a 43$^{rd}$ column correspond to the target object sub-type "Green Dragon", and an isolated status region in a 46$^{th}$ column correspond to the target object sub-type "White Dragon".

In operation S503, the network device inputs the virtual application object status plane to a probability acquisition network, to acquire an output probability of a to-be-outputted virtual mahjong tile.

In operation S504, the network device determines a target virtual mahjong tile from the plurality of to-be-outputted virtual mahjong tiles based on the output probability of the to-be-outputted virtual mahjong tile for outputting.

In operation S505, the network device updates the to-be-outputted virtual mahjong tiles.

In operation S506, the network device updates the current status information of the virtual mahjong tiles when the to-be-outputted virtual mahjong tiles do not satisfy an end condition.

In operation S507, the network device returns to the step of constructing the virtual application object status plane based on the current status information.

The foregoing step of determining the target virtual application object based on the neural network has been described above, so the details will not be described herein again.

According to an embodiment, the current status information of the plurality of virtual mahjong tiles in the online mahjong game application, the object types of the plurality of virtual mahjong tiles, the target object sub-types to be isolated, and the region size of the isolation region between two target object sub-types may be acquired by using the network device, the virtual application object status plane may be constructed based on the current status information, the object types, the target object sub-types, and the region size, the virtual application object status plane may be inputted to the probability acquisition network to obtain output probability of the to-be-outputted virtual mahjong tile, the target virtual mahjong tile may be determined from the to-be-outputted virtual mahjong tiles based on the output probability of the to-be-outputted virtual mahjong tile for outputting, and the to-be-outputted virtual mahjong tiles may be updated. When the to-be-outputted virtual mahjong tile does not satisfy the end condition, the current status information of the virtual mahjong tile is updated, and the step of constructing the virtual application object status plane based on the current status information is returned to. In this embodiment, the current status information of the virtual application objects in the virtual application is represented by using a status plane, so that the current status information can be concisely and accurately represented in the status plane, thereby facilitating identification and learning of the neural network to determine the output probability corresponding to the to-be-outputted virtual application object. In this embodiment, the virtual application objects to be distinguished between each other are strictly distinguished between each other by inserting the isolation region in the status plane, which reduces the possibility of misjudgment of scoring types, thereby improving the accuracy of outputting a target virtual application object.

Figure 6:
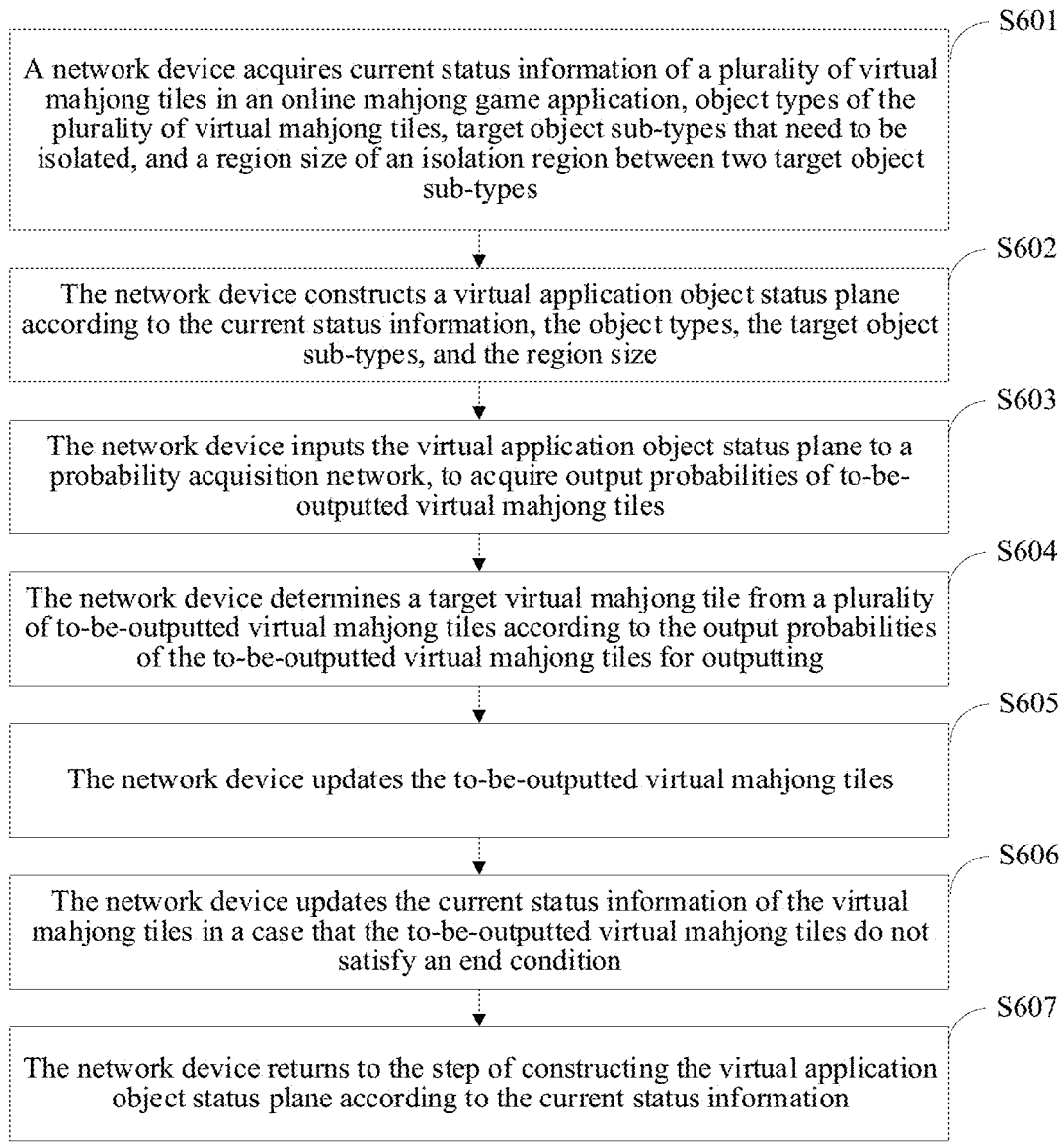
FIG. 6 is a fifth flowchart of the method for outputting a virtual application object according to an embodiment.

FIG. 6 is a fifth flowchart of the method for outputting a virtual application object according to an embodiment. Referring to FIG. 6, a specific process of the method for outputting a virtual application object in the embodiments may be as follows:

In operation S601, a network device acquires current status information of a plurality of virtual mahjong tiles in an online mahjong game application, object types of the plurality of virtual mahjong tiles, target object sub-types to be isolated, and a region size of an isolation region between two target object sub-types.

In operation S602, the network device constructs a virtual application object status plane based on the current status information, the object types, the target object sub-types, and the region size.

During operation, the network device may construct the virtual application object status plane shown in FIG. 21a based on the current status information and the object type corresponding to each of the virtual mahjong tiles, the target object sub-types, and the region size. The virtual application object status plane includes 5 rotated status sub-planes and a plurality of isolation regions. Each rotated status sub-plane corresponds to one object type. The isolation regions isolate different object types and different target object sub-types. In the figure, the virtual application object status plane is a 9*24 rectangular array. A longitudinal direction represents face values 1 to 9 of the virtual mahjong tiles, and five rotated status sub-planes corresponding to "Character", "Bamboo", "Dot", "Wind", and "Dragon" are in a horizontal direction.

In operation S603, the network device inputs the virtual application object status plane to a probability acquisition network, to acquire an output probability of a to-be-outputted virtual mahjong tile.

In operation S604, the network device determines a target virtual mahjong tile from the plurality of to-be-outputted virtual mahjong tiles based on the output probability of the to-be-outputted virtual mahjong tile for outputting.

In operation S605, the network device updates the to-be-outputted virtual mahjong tiles.

In operation S606, the network device updates the current status information of the virtual mahjong tiles when the to-be-outputted virtual mahjong tiles do not satisfy an end condition.

In operation S607, the network device returns to the step of constructing the virtual application object status plane based on the current status information.

The foregoing step of determining the target virtual application object based on the neural network has been described above, so the details will not be described herein again.

According to an embodiment, the current status information of the plurality of virtual mahjong tiles in the online mahjong game application, the object types of the plurality of virtual mahjong tiles, the target object sub-types to be isolated, and the region size of the isolation region between two target object sub-types may be acquired by using the network device, the virtual application object status plane may be constructed based on the current status information, the object types, the target object sub-types, and the region size, the virtual application object status plane may be inputted to the probability acquisition network to obtain output probability of the to-be-outputted virtual mahjong tile, the target virtual mahjong tile may be determined from the to-be-outputted virtual mahjong tiles based on the output probability of the to-be-outputted virtual mahjong tile for outputting, and the to-be-outputted virtual mahjong tiles may be updated. When the to-be-outputted virtual mahjong tile does not satisfy the end condition, the current status information of the virtual mahjong tile is updated, and the step of constructing the virtual application object status plane based on the current status information is returned to. In this embodiment, the current status information of the virtual application objects in the virtual application is represented by using a status plane, so that the current status information can be concisely and accurately represented in the status plane, thereby facilitating identification and learning of the neural network to determine the output probability corresponding to the to-be-outputted virtual application object. In this embodiment, the to-be-rotated status sub-plane may be rotated, so that the entire status plane is more approximate to a square, thereby facilitating the learning of the neural network. Moreover, in this embodiment, the virtual application objects to be distinguished between each other are strictly distinguished between each other by inserting the isolation region in the status plane, which reduces the possibility of misjudgment of scoring types, thereby improving the accuracy of outputting a target virtual application object.

To better implement the foregoing method, an embodiment may further provide an apparatus for outputting a virtual application object. The apparatus for outputting a virtual application object may be specifically integrated in a network device. The network device may include a terminal, a server, and the like. The terminal may include a mobile phone, a tablet computer, a notebook computer, a PC, or the like.

Figure 22:
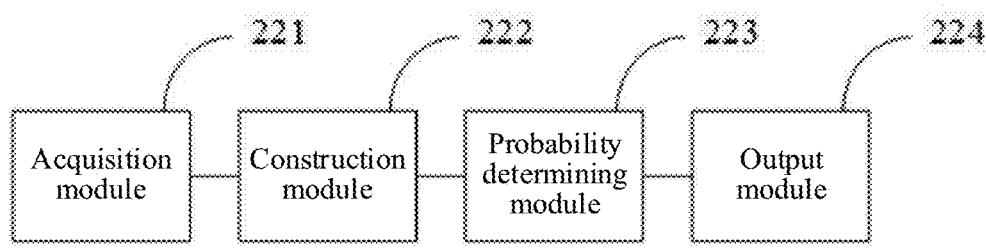
FIG. 22 is a structural diagram of an apparatus for outputting a virtual application object according to an embodiment.

FIG. 22 is a structural diagram of an apparatus for outputting a virtual application object according to an embodiment. For example, as shown in FIG. 22, the apparatus for outputting a virtual application object may include an acquisition module 221, a construction module 222, a probability determining module 223, and an output module 224.

The acquisition module 221 is configured to acquire current status information of a plurality of virtual application objects in a virtual application, the current status information indicating that a virtual application object is in a known state or in an unknown state.

The construction module 222 is configured to construct a virtual application object status plane based on the current status information of the plurality of virtual application objects, the virtual application object status plane including a region corresponding to each virtual application object, the region including the current status information of the corresponding virtual application object.

The probability determining module 223 is configured to determine output probabilities respectively corresponding to a plurality of to-be-outputted virtual application objects based on the virtual application object status plane.

The output module 224 is configured to determine a target virtual application object from the plurality of to-be-outputted virtual application objects based on the output probabilities respectively corresponding to the plurality of to-be-outputted virtual application objects for outputting.

In an embodiment, the construction module 222 may include a first acquisition sub-module and a first construction sub-module.

The first acquisition sub-module is configured to acquire object types of the plurality of virtual application objects.

The first construction sub-module is configured to construct the virtual application object status plane based on the current status information and the object types, the virtual application object status plane including a plurality of status sub-planes and a plurality of isolation regions, the status sub-planes corresponding to the object types, and each of the isolation regions being located between two adjacent status sub-planes.

In an embodiment, the first acquisition sub-module may be further configured to construct a first initial status plane based on the current status information, segment the first initial status plane into the plurality of status sub-planes based on the object types, and insert each isolation region between the two adjacent status sub-planes to obtain the virtual application object status plane.

In an embodiment, the first construction sub-module may include a first determining sub-module and a second construction sub-module.

The first determining sub-module is configured to determine a target object type from the plurality of object types to be isolated, the target object type including a plurality of target object sub-types.

The second construction sub-module is configured to construct the virtual application object status plane based on the current status information, the object types, and the target object sub-types, each of the status sub-planes in the virtual application object status plane including a plurality of isolated status regions, the isolated status regions corresponding to the target object sub-types, and each isolation region in the virtual application object status plane being also located between two adjacent isolated status regions.

In an embodiment, the second construction sub-module may include a second determining sub-module and a third construction sub-module.

The second determining sub-module is configured to determine a region size of each isolation region between two target object sub-types to be isolated.

The third construction sub-module is configured to construct the virtual application object status plane based on the current status information, the object types, the target object sub-types, and the region size, each isolation region of the region size being included between two isolated status regions in the virtual application object status plane.

In an embodiment, the third construction sub-module may be further configured to construct a second initial status plane based on the current status information and the object types, determine a target status sub-plane corresponding to the target object type in the second initial status plane, segment the target status sub-plane into a plurality of isolated status regions based on the target object sub-types, insert each isolation region of the region size between two adjacent isolated status regions to obtain an isolated initial status plane, and construct the virtual application object status plane based on the isolated initial status plane and the second initial status plane.

In an embodiment, the third construction sub-module may be further configured to construct a third initial status plane based on the current status information, the object types, the target object sub-types, and the region size, segment the third initial status plane into a plurality of to-be-rotated status sub-planes based on the object types, rotate the to-be-rotated status sub-planes to obtain rotated status sub-planes, and insert each isolation region between two adjacent rotated status sub-planes to obtain the virtual application object status plane.

In an embodiment, the apparatus for outputting a virtual application object may further include a first update module, a second update module, a returning module, and an ending module.

The first update module is configured to update the to-be-outputted virtual application objects.

The second update module is configured to update the current status information of the virtual application objects when the to-be-outputted virtual application objects do not satisfy an end condition.

The returning module is configured to return to the step of constructing the virtual application object status plane based on the current status information of the plurality of virtual application objects.

The ending module is configured to stop the outputting when the to-be-outputted virtual application objects satisfy the end condition.

In an embodiment, the probability acquisition module 223 may be further configured to input the virtual application object status plane to a probability acquisition network, and acquire the output probabilities corresponding to the to-be-outputted virtual application objects based on the probability acquisition network.

In an embodiment, the apparatus for outputting a virtual application object may further include a second acquisition sub-module, a training sub-module, and a convergence sub-module.

The second acquisition sub-module is configured to acquire a plurality of sample status planes and real output objects corresponding to the sample status planes.

The training sub-module is configured to train a preset-probability acquisition network based on the sample status planes, to obtain predicted output objects corresponding to the sample status planes.

The convergence sub-module is configured to converge the preset-probability acquisition network based on the real output objects and the predicted output objects corresponding to the sample status planes, to obtain the probability acquisition network.

During specific implementation, the foregoing units may be implemented as independent entities, or may be combined arbitrarily and implemented as the same entity or a plurality of entities. For specific implementation of the foregoing units, reference can be made to the foregoing method embodiments, so the details are not described herein again.

Based on the apparatus for outputting a virtual application object in an embodiment, the current status information of the plurality of virtual application objects in the virtual application is acquired by using the acquisition module 221, the current status information indicating that a virtual application object is in a known state or an unknown state, the virtual application object status plane is constructed by using the construction module 222 based on the current status information of the plurality of virtual application objects, the virtual application object status plane including the region corresponding to each virtual application object, the region including the current status information of the corresponding virtual application object, the output probabilities respectively corresponding to the plurality of to-be-outputted virtual application objects are determined by using the probability determining module 223 based on the virtual application object status plane, and the target virtual application object is determined from the plurality of to-be-outputted virtual application objects by using the output module 224 based on the output probabilities respectively corresponding to the plurality of to-be-outputted virtual application objects for outputting. In this embodiment, the current status information of the virtual application objects in the virtual application is represented by using a status plane, so that the current status information can be concisely and accurately represented in the status plane, thereby facilitating identification and learning of the neural network to determine the output probabilities respectively corresponding to the plurality of to-be-outputted virtual application objects. In this embodiment, the to-be-rotated status sub-plane may be rotated, so that the entire status plane is more approximate to a square, thereby facilitating the learning of the neural network. Moreover, in this embodiment, the virtual application objects to be distinguished between each other are strictly distinguished between each other by inserting the isolation region in the status plane, which reduces the possibility of misjudgment of scoring types, thereby improving the accuracy of outputting a target virtual application object.

An embodiment further provides a network device. The network device may integrate any apparatus for outputting a virtual application object provided in the embodiments.

Figure 23:
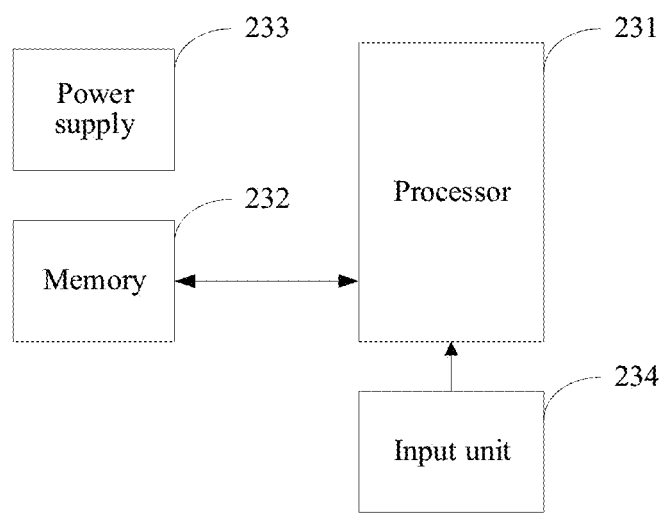
FIG. 23 is a structural diagram of a network device according to an embodiment.

FIG. 23 is a structural diagram of a network device according to an embodiment. For example, FIG. 23 is a schematic structural diagram of a network device according to an embodiment. Specifically:

The network device may include components such as a processor 231 including one or more processing cores, a memory 232 including one or more computer-readable storage media, a power supply 233, and an input unit 234. A person skilled in the art may understand that the structure of the network device shown in FIG. 23 is not limited to the network device, and the network device may include more or fewer components than those shown in the figure, or some components may be combined, or a different component deployment may be used.

The processor 231 is the control center of the network device, connects all parts of the entire network device by using various interfaces and lines, and executes various functions and processing data of the network device by running or executing software programs and/or modules stored in the memory 232, and calling data stored in the memory 232, thereby performing overall monitoring on the network device. Optionally, the processor 231 may include one or more processing cores. Preferably, the processor 231 may be integrated as an application processor and a modem processor. The application processor mainly processes an operating system, a user interface, an application program, and the like. The modem processor mainly processes wireless communication. It may be understood that, the modem processor may alternatively not be integrated in the processor 231.

The memory 232 may be configured to store the software programs and modules. The processor 231 runs the software programs and modules stored in the memory 232, to perform various function application and data processing. The memory 232 may mainly include a program storage area and a data storage area. The program storage area may store an operating system, an application program required by at least one function (such as a sound playing function and an image display function), and the like. The data storage area may store data created according to use of the network device, and the like. In addition, the memory 232 may include a high speed random access memory, and may further include a non-volatile memory, such as at least one magnetic disk storage device, a flash storage device or other non-volatile solid state storage devices. Correspondingly, the memory 232 may further include a memory controller, to allow the processor 231 to access the memory 232.

The network device further includes the power supply 233 for supplying power to the components. Preferably, the power supply 233 may be logically connected to the processor 231 by using a power management system, thereby implementing functions such as charging, discharging, and power consumption management by using the power management system. The power supply 233 may further include one or more of a direct current or alternating current power supply, a re-charging system, a power failure detection circuit, a power supply converter or inverter, a power supply state indicator, and any other components.

The network device may further include the input unit 234. The input unit 234 may be configured to receive input digit or character information and generate keyboard, mouse, joystick, optical, or trackball signal input related to user settings and function control.

Although not shown in the figure, the network device may further include a display unit, and the like. Details are not described herein again. Specifically, in an embodiment, the processor 231 in the network device may load executable files corresponding to processes of one or more application programs to the memory 232 according to the following instructions, and the processor 231 runs the application programs stored in the memory 232 to implement the following various functions: acquiring current status information of a plurality of virtual application objects in a virtual application, the current status information indicating that a virtual application object is in a known state or in an unknown state; constructing a virtual application object status plane based on the current status information of the plurality of virtual application objects, the virtual application object status plane including a region corresponding to each virtual application object, the region including the current status information of the corresponding virtual application object, determining output probabilities respectively corresponding to a plurality of to-be-outputted virtual application objects based on the virtual application object status plane; and determining a target virtual application object from the plurality of to-be-outputted virtual application objects based on the output probabilities respectively corresponding to the plurality of to-be-outputted virtual application objects for outputting.

For specific implementations of the above operations, refer to the foregoing embodiments.

The network device in an embodiment may acquire the current status information of the plurality of virtual application objects in the virtual application, the current status information indicating that a virtual application object is in a known state or an unknown state; construct the virtual application object status plane based on the current status information of the plurality of virtual application objects, the virtual application object status plane including the region corresponding to each virtual application object, the region including the current status information of the corresponding virtual application object; determine the output probabilities respectively corresponding to the plurality of to-be-outputted virtual application objects based on the virtual application object status plane; and determine the target virtual application object from the plurality of to-be-outputted virtual application objects based on the output probabilities respectively corresponding to the plurality of to-be-outputted virtual application objects for outputting. In this embodiment, the current status information of the virtual application objects in the virtual application is represented by using a status plane, so that the current status information can be concisely and accurately represented in the status plane, thereby facilitating identification and learning of the neural network to determine the output probability corresponding to the to-be-outputted virtual application object. In this embodiment, the to-be-rotated status sub-plane may be rotated, so that the entire status plane is more approximate to a square, thereby facilitating the learning of the neural network. Moreover, in this embodiment, the virtual application objects to be distinguished between each other are strictly distinguished between each other by inserting the isolation region in the status plane, which reduces the possibility of misjudgment of scoring types, thereby improving the accuracy of outputting a target virtual application object.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

In view of this, an embodiment provides a non-transitory computer-readable storage medium storing computer instructions that, when executed by at least one processor of a device, cause the at least one processor to: acquire current status information of a plurality of virtual application objects in a virtual application, the current status information indicating that a virtual application object is in a known state or in an unknown state, construct a virtual application object status plane based on the current status information of the plurality of virtual application objects, wherein the virtual application object status plane includes a region corresponding to each virtual application object, the region includes the current status information of the corresponding virtual application object, determine, based on the virtual application object status plane, output probabilities corresponding to a plurality of to-be-outputted virtual application objects, and determine, based the output probabilities corresponding to the plurality of to-be-outputted virtual application objects, a target virtual application object from the plurality of to-be-outputted virtual application objects.

For specific implementations of the above operations, refer to the foregoing embodiments.

The storage medium may include a read-only memory (ROM), a random access memory (RAM), a magnetic disk, an optical disc, or the like.

Because the instructions stored in the storage medium may perform the steps of any method for outputting a virtual application object provided in the embodiments, the instructions can implement beneficial effects that may be implemented by any method for outputting a virtual application object provided in the embodiments. For details, reference may be made to the foregoing embodiments. Details are not described herein again.

The method, apparatus, and computer storage medium for outputting a virtual application object provided in the embodiments are described above in detail. Although the principles and implementations are described by using specific examples in this specification, the descriptions of the foregoing embodiments are merely intended to help understand the disclosure. Meanwhile, a person skilled in the art may make modifications to the specific implementations and application range according to the disclosure. In conclusion, the content of this specification shall not be construed as a limitation.

What is claimed is:

1. A method for outputting a virtual application object, performed by a network device, the method comprising:
acquiring current status information of a plurality of virtual application objects in a virtual application, the current status information indicating that a virtual application object is in a known state or in an unknown state;
constructing a virtual application object status plane based on the current status information of the plurality of virtual application objects, wherein the virtual application object status plane includes a region corresponding to each virtual application object, and the region includes the current status information of the corresponding virtual application object;

determining, based on the virtual application object status plane, output probabilities respectively corresponding to a plurality of to-be-outputted virtual application objects; and determining, based the output probabilities respectively corresponding to the plurality of to-be-outputted virtual application objects, a target virtual application object from the plurality of to-be-outputted virtual application objects.

2. The method of claim 1, wherein the constructing the virtual application object status plane based on the current status information of the plurality of virtual application objects comprises:

acquiring object types of the plurality of virtual application objects; and constructing the virtual application object status plane based on the current status information and the acquired object types, wherein the virtual application object status plane includes a plurality of status sub-planes and a plurality of isolation regions, the plurality of status sub-planes correspond to the object types, and each of the isolation regions are located between two adjacent status sub-planes.

3. The method of claim 2, wherein the constructing the virtual application object status plane based on the current status information and the object types comprises:

constructing a first initial status plane based on the current status information;

segmenting the first initial status plane into the plurality of status sub-planes based on the object types; and inserting each isolation region between the two adjacent status sub-planes to obtain the virtual application object status plane.

4. The method of claim 2, wherein the constructing the virtual application object status plane based on the current status information and the acquired object types comprises:

determining a target object type from the acquired object types to be isolated, the target object type including a plurality of target object sub-types; and constructing the virtual application object status plane based on the current status information, the acquired object types, and the plurality target object sub-types, wherein each of the status sub-planes in the virtual application object status plane includes a plurality of isolated status regions, the plurality of isolated status regions correspond to the plurality of target object sub-types, and each isolation region in the virtual application object status plane is located between two adjacent isolated status regions.

5. The method of claim 4, wherein the constructing the virtual application object status plane based on the current status information, the acquired object types, and the plurality of target object sub-types comprises:

determining a region size of each isolation region between two target object sub-types to be isolated; and constructing the virtual application object status plane based the current status information, the acquired object types, the plurality of target object sub-types, and the region size, wherein each isolation region of the region size is positioned between two isolated status regions in the virtual application object status plane.

6. The method of claim 5, wherein the constructing the virtual application object status plane based on the current status information, the acquired object types, the plurality of target object sub-types, and the region size comprises:

constructing a second initial status plane based on the current status information and the acquired object types;

determining a target status sub-plane corresponding to a target object type in the second initial status plane;

segmenting the target status sub-plane into a plurality of isolated status regions based on the plurality of target object sub-types;

inserting each isolation region of the region size between two adjacent isolated status regions to obtain an isolated initial status plane; and constructing the virtual application object status plane based on the isolated initial status plane and the second initial status plane.

7. The method of claim 5, wherein the constructing the virtual application object status plane based on the current status information, the acquired object types, the plurality of target object sub-types, and the region size comprises:

constructing a third initial status plane based on the current status information, the acquired object types, the plurality of target object sub-types, and the region size;

segmenting the third initial status plane into a plurality of to-be-rotated status sub-planes based on the acquired object types;

rotating the to-be-rotated status sub-planes to obtain rotated status sub-planes; and inserting each isolation region between two adjacent rotated status sub-planes to obtain the virtual application object status plane.

8. The method of claim 1, wherein, after the determining a target virtual application object from the plurality of to-be-outputted virtual application objects based on the output probabilities respectively corresponding to the plurality of to-be-outputted virtual application objects, the method further comprises:

updating the plurality of to-be-outputted virtual application objects;

updating the current status information of the plurality of virtual application objects based on the plurality of to-be-outputted virtual application objects not satisfying an end condition, and returning to the operation of constructing the virtual application object status plane based on the current status information of the plurality of virtual application objects; and ending the outputting based on the plurality of to-be-outputted virtual application objects satisfying the end condition.

9. The method of claim 1, wherein determining output probabilities respectively corresponding to a plurality of to-be-outputted virtual application objects based the virtual application object status plane comprises:

inputting the virtual application object status plane to a probability acquisition network; and acquiring the output probabilities corresponding to the plurality of to-be-outputted virtual application objects based on the probability acquisition network.

10. The method of claim 9, further comprising:
acquiring a plurality of sample status planes and a plurality of real output objects corresponding to the plurality of sample status planes;
training a preset-probability acquisition network based on the plurality of sample status planes to obtain predicted output objects corresponding to the plurality of sample status planes; and
converging the preset-probability acquisition network based on the plurality of real output objects and the predicted output objects corresponding to the plurality of sample status planes, to obtain the probability acquisition network.

11. An apparatus for outputting a virtual application object, the apparatus comprising:
at least one memory configured to store computer program code; and
at least one processor configured to access said computer program code and operate as instructed by said computer program code, said computer program code including:
first acquisition code configured to cause the at least one processor to acquire current status information of a plurality of virtual application objects in a virtual application, the current status information indicating that a virtual application object is in a known state or in an unknown state;
construction code configured to cause the at least one processor to construct a virtual application object status plane based on the current status information of the plurality of virtual application objects, wherein the virtual application object status plane includes a region corresponding to each virtual application object, and the region includes the current status information of the corresponding virtual application object;
determining code configured to cause the at least one processor to determine, based on the virtual application object status plane, output probabilities corresponding to a plurality of to-be-outputted virtual application objects; and
outputting code configured to cause the at least one processor to determine, based the output probabilities corresponding to the plurality of to-be-outputted virtual application objects, a target virtual application object from the plurality of to-be-outputted virtual application objects.

12. The apparatus of claim 11, wherein the constructing code is further configured to cause the at least one processor to:
acquire object types of the plurality of virtual application objects; and
construct the virtual application object status plane based on the current status information and the acquired object types,
wherein the virtual application object status plane includes a plurality of status sub-planes and a plurality of isolation regions, the plurality of status sub-planes correspond to the object types, and each of the isolation regions are located between two adjacent status sub-planes.

13. The apparatus of claim 12, wherein the constructing code is further configured to cause the at least one processor to:
construct a first initial status plane based on the current status information;
segment the first initial status plane into the plurality of status sub-planes based on the object types; and
insert each isolation region between the two adjacent status sub-planes to obtain the virtual application object status plane.

14. The apparatus of claim 12, wherein the constructing code is further configured to cause the at least one processor to:
determine a target object type from the acquired object types to be isolated, the target object type including a plurality of target object sub-types; and
construct the virtual application object status plane based on the current status information, the acquired object types, and the plurality target object sub-types,
wherein each of the status sub-planes in the virtual application object status plane includes a plurality of isolated status regions, the plurality of isolated status regions correspond to the plurality of target object sub-types, and each isolation region in the virtual application object status plane is located between two adjacent isolated status regions.

15. The apparatus of claim 14, wherein the constructing code is further configured to cause the at least one processor to:
determine a region size of each isolation region between two target object sub-types to be isolated; and
construct the virtual application object status plane based the current status information, the acquired object types, the plurality of target object sub-types, and the region size,
wherein each isolation region of the region size is positioned between two isolated status regions in the virtual application object status plane.

16. The apparatus of claim 15, wherein the constructing code is further configured to cause the at least one processor to:
construct a second initial status plane based on the current status information and the acquired object types;
determine a target status sub-plane corresponding to a target object type in the second initial status plane;
segment the target status sub-plane into a plurality of isolated status regions based on the plurality of target object sub-types;
insert each isolation region of the region size between two adjacent isolated status regions to obtain an isolated initial status plane; and
construct the virtual application object status plane based on the isolated initial status plane and the second initial status plane.

17. The apparatus of claim 15, wherein the constructing code is further configured to cause the at least one processor to:
construct a third initial status plane based on the current status information, the acquired object types, the plurality of target object sub-types, and the region size;
segment the third initial status plane into a plurality of to-be-rotated status sub-planes based on the acquired object types;
rotate the to-be-rotated status sub-planes to obtain rotated status sub-planes; and
insert each isolation region between two adjacent rotated status sub-planes to obtain the virtual application object status plane.

18. The apparatus of claim 11, wherein the determining code is further configured to cause the at least one processor to:
input the virtual application object status plane to a probability acquisition network; and acquire the output probabilities corresponding to the plurality of to-be-outputted virtual application objects based on the probability acquisition network.

19. The apparatus of claim 18, wherein the computer program code further comprises:
   second acquisition code configured to cause the at least one processor to acquire a plurality of sample status planes and a plurality of real output objects corresponding to the plurality of sample status planes;
   training code configured to cause the at least one processor to train a preset-probability acquisition network based on the plurality of sample status planes to obtain predicted output objects corresponding to the plurality of sample status planes; and
   converging code configured to cause the at least one processor to converge the preset-probability acquisition network based on the plurality of real output objects and the predicted output objects corresponding to the plurality of sample status planes, to obtain the probability acquisition network.

20. A non-transitory computer-readable storage medium storing computer instructions that, when executed by at least one processor of a device, cause the at least one processor to:

acquire current status information of a plurality of virtual application objects in a virtual application, the current status information indicating that a virtual application object is in a known state or in an unknown state;

construct a virtual application object status plane based on the current status information of the plurality of virtual application objects, wherein the virtual application object status plane includes a region corresponding to each virtual application object, the region includes the current status information of the corresponding virtual application object;

determine, based on the virtual application object status plane, output probabilities corresponding to a plurality of to-be-outputted virtual application objects; and determine, based the output probabilities corresponding to the plurality of to-be-outputted virtual application objects, a target virtual application object from the plurality of to-be-outputted virtual application objects.

* * * * *